(12) United States Patent
Kazawa et al.

(10) Patent No.: US 8,260,135 B2
(45) Date of Patent: Sep. 4, 2012

(54) PASSIVE OPTICAL NETWORK SYSTEM AND WAVELENGTH ASSIGNMENT METHOD

(75) Inventors: Tohru Kazawa, Kokubunji (JP); Kenichi Sakamoto, Kokubunji (JP); Ryosuke Nishino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 95 days.

(21) Appl. No.: 12/973,319

(22) Filed: Dec. 20, 2010

(65) Prior Publication Data
US 2011/0091213 A1   Apr. 21, 2011

Related U.S. Application Data

(63) Continuation of application No. 11/819,364, filed on Jun. 27, 2007, now Pat. No. 7,873,277.

(30) Foreign Application Priority Data

Jan. 9, 2007   (JP) .................................. 2007-001690

(51) Int. Cl.
*H04J 14/00* (2006.01)
*H04J 14/02* (2006.01)

(52) U.S. Cl. ................ 398/68; 398/66; 398/43; 398/67; 398/69

(58) Field of Classification Search .................... 398/66, 398/43, 68
See application file for complete search history.

(56) References Cited

U.S. PATENT DOCUMENTS

| | | | |
|---|---|---|---|
| 6,097,736 A | 8/2000 | Proctor et al. | |
| 7,366,415 B2 | 4/2008 | Lee et al. | |
| 7,502,563 B2 * | 3/2009 | Nozue et al. | ............. 398/69 |
| 7,684,703 B2 * | 3/2010 | Harada | ............. 398/68 |
| 7,734,178 B2 | 6/2010 | Sakamoto et al. | |
| 7,877,013 B2 * | 1/2011 | Effenberger | ............. 398/68 |
| 7,920,792 B2 * | 4/2011 | Palacharla et al. | ............. 398/72 |

(Continued)

FOREIGN PATENT DOCUMENTS

JP   11-163802   6/1999

(Continued)

OTHER PUBLICATIONS

"Gigabit-capable Passive Optical Networks (G-PON): Transmission convergence layer specification", ITU-T Telecommunication Standardization Sector of ITU G.984.3, Feb. 2004, International Telecommunication Union.

(Continued)

*Primary Examiner* — Shi K Li
*Assistant Examiner* — Oommen Jacob
(74) *Attorney, Agent, or Firm* — McDermott Will & Emery LLP

(57) ABSTRACT

In a PON system with WDM, at the time of initial setting, each ONU negotiates with an OLT, and automatically acquires a wavelength which can be used by the ONU. One wavelength for negotiation of assigned wavelength is fixed as a default, and a newly connected ONU first uses the wavelength. The OLT 200 includes a plurality of light sources for downstream communication. The ONU 300 includes a wavelength variable filter selectively receiving one of wavelengths of downstream communication, and a wavelength variable light source selectively emitting light of one of plural wavelengths for upstream communication. The ONU 300 uses a transmission wavelength (for example, $\lambda u32$) for negotiation and transmits a wavelength assignment request 1000 to the OLT 200. The OLT 200 selects a wavelength $\lambda u1$ to be assigned from unused wavelengths, and transmits wavelength information to the ONU 300. The OLT 200 and the ONU 300 communicates using the notified wavelengths.

4 Claims, 16 Drawing Sheets

U.S. PATENT DOCUMENTS

| | | | |
|---|---|---|---|
| 2002/0093709 A1 | 7/2002 | Kim et al. | |
| 2002/0097731 A1 | 7/2002 | Tancevski | |
| 2004/0179855 A1 | 9/2004 | Harada | |
| 2005/0030986 A1 | 2/2005 | Farrell et al. | |
| 2005/0158048 A1* | 7/2005 | Sung et al. | 398/66 |
| 2006/0115271 A1 | 6/2006 | Hwang et al. | |
| 2006/0146855 A1 | 7/2006 | Kani et al. | |
| 2006/0222365 A1 | 10/2006 | Jung et al. | |
| 2006/0268704 A1* | 11/2006 | Ansari et al. | 370/230 |
| 2007/0092256 A1 | 4/2007 | Nozue et al. | |
| 2007/0230957 A1* | 10/2007 | Ozaki | 398/71 |
| 2008/0138072 A1 | 6/2008 | Sakamoto et al. | |
| 2009/0016726 A1 | 1/2009 | Suzuki et al. | |
| 2010/0221007 A1* | 9/2010 | Sakamoto et al. | 398/67 |
| 2010/0232790 A1* | 9/2010 | Ansari et al. | 398/34 |
| 2011/0091213 A1* | 4/2011 | Kawaza et al. | 398/68 |

FOREIGN PATENT DOCUMENTS

| | | |
|---|---|---|
| JP | 2002-290422 | 10/2002 |
| JP | 2003-324456 | 11/2003 |
| JP | 2004-214891 | 7/2004 |
| JP | 2004-241855 | 8/2004 |
| JP | 2004-274636 | 9/2004 |
| JP | 2006-197489 | 7/2006 |
| JP | 2007-043270 | 2/2007 |
| JP | 2007-274627 | 10/2007 |
| WO | WO 2004/114555 A1 | 12/2004 |
| WO | WO 2007/086514 A1 | 8/2007 |

OTHER PUBLICATIONS

Entire Prosecution of U.S. Appl. No. 11/819,364 to Kazawa, et al., filed Jun. 27, 2007, entitled "Passive Optical Network System and Wavelength Assignment Method".

* cited by examiner

221

| SERIAL NUMBER | CONNECTION LABEL | ONU-ID |
|---|---|---|
| A000 0001 | 1 | 1 |
| A000 0002 | 9 | 2 |
|  | . . . | . . . |
| A000 00032 | 4 | 32 |

| ONU-ID | SERIAL NUMBER | DOWNSTREAM WAVELENGTH | UPSTREAM WAVELENGTH |
|---|---|---|---|
| 1 | A000 0001 | $\lambda d1$ | $\lambda u1$ |
| 2 | A000 0002 | $\lambda d2$ | $\lambda u2$ |
| ... |  | ... | ... |
| 32 | UNREGISTERED | $\lambda d32$ MANAGEMENT | $\lambda u32$ MANAGEMENT |

FIG. 6

USER SIGNAL TRANSFER FRAME VIEW

WAVELENGTH REQUEST SIGNAL

WAVELENGTH ASSIGNMENT PLOAM MESSAGE

WAVELENGTH CONFIRMATION PLOAM MESSAGE

CONTROL WAVELENGTH NOTIFICATION PLOAM MESSAGE

220

| ONU-ID | SERIAL NUMBER | DOWNSTREAM WAVELENGTH | UPSTREAM WAVELENGTH |
|---|---|---|---|
| 1 | UNREGISTERED | λd1 | λu1 |
| 2 | UNREGISTERED | λd2 | λu2 |
| ... | | ... | ... |
| 32 | UNREGISTERED | λd32 MANAGEMENT | λu32 MANAGEMENT |

FIG. 12A

| ONU-ID | SERIAL NUMBER | DOWNSTREAM WAVELENGTH | UPSTREAM WAVELENGTH |
|---|---|---|---|
| 1 | A000 0001 | λd1 | λu1 |
| 2 | UNREGISTERED | λd2 | λu2 |
| ... | | ... | ... |
| 32 | UNREGISTERED | λd32 MANAGEMENT | λu32 MANAGEMENT |

FIG. 12B

| ONU-ID | SERIAL NUMBER | DOWNSTREAM WAVELENGTH | UPSTREAM WAVELENGTH |
|---|---|---|---|
| 1 | A000 0001 | λd1 | λu1 |
| 2 | A000 0002 | λd2 | λu2 |
| ... | | ... | ... |
| 32 | UNREGISTERED | λd32 MANAGEMENT | λu32 MANAGEMENT |

| ONU-ID | SERIAL NUMBER | DOWNSTREAM WAVELENGTH | UPSTREAM WAVELENGTH |
|---|---|---|---|
| 1 | A000 0001 | λd1 | λu1 |
| 2 | A000 0002 | λd2 | λu2 |
| ... | | ... | ... |
| 32 | A000 0020 | λd32 MANAGEMENT | λu32 MANAGEMENT |

FIG. 13A

| ONU-ID | SERIAL NUMBER | DOWNSTREAM WAVELENGTH | UPSTREAM WAVELENGTH |
|---|---|---|---|
| 1 | A000 0001 | λd1 | λu1 |
| 2 | UNREGISTERED | λd2 MANAGEMENT | λu2 MANAGEMENT |
| ... | | ... | ... |
| 32 | A000 0020 | λd32 | λu32 |

FIG. 13B

| ONU-ID | SERIAL NUMBER | DOWNSTREAM WAVELENGTH | UPSTREAM WAVELENGTH |
|---|---|---|---|
| 1 | A000 0001 | λd1 | λu1 |
| 2 | A000 0040 | λd2 MANAGEMENT | λu2 MANAGEMENT |
| ... | | ... | ... |
| 32 | A000 0020 | λd32 | λu32 |

FIG. 13C

PASSIVE OPTICAL NETWORK SYSTEM AND WAVELENGTH ASSIGNMENT METHOD

RELATED APPLICATIONS

This application is a Continuation of U.S. patent application Ser. No. 11/819,364, filed on Jun. 27, 2007 now U.S. Pat. No. 7,873,277, claiming priority of Japanese Patent Application No. 2007-001690, filed on Jan. 9, 2007, the entire contents of each of which are hereby incorporated by reference.

BACKGROUND OF THE INVENTION

The present invention relates to a passive optical network system and a wavelength assignment method, and particularly to a passive optical network system and a wavelength assignment method in which plural subscriber connection devices share an optical transmission line and communication is carried out by wavelength division multiplexing.

A Passive Optical Network (PON) includes an Optical Line Termination (OLT) and plural Optical Network Units (ONU) or Optical Network Terminations (ONT) (hereinafter, these are also called optical network units). A signal, as an optical signal, from a terminal (PC etc.) connected to the ONU is optically multiplexed to an optical fiber to the OLT from the ONU through an optical fiber and an optical splitter and is sent to the OLT. After the OLT performs various signal processings, communication from a terminal of an ONU to a terminal of another ONU of the PON or communication with a terminal of a NW is carried out.

As the optical multiplexing system, there is a system such as Time Division Multiplexing (TDM), Wavelength Division Multiplexing (WDM) or Code Division Multiplexing (CDM). For example, G-PON defined in ITU-T recommendation G.984.3 is a system in which different wavelengths are used for upstream/downstream communication, and in the communication between an optical line termination (OLT) installed in a station and a network unit (ONU) installed at each user, the communication of signals is carried out by time division multiplexing (TDM) in which signal communication time is assigned to each ONU (see, for example, non-patent document 1).

On the other hand, in the WDM system, between an OLT and an ONU, plural waves with different wavelengths are multiplexed to both an upstream signal and a downstream signal, and each ONU receives and transmits a specific wavelength to carry out communication with the OLT. An individual wavelength is assigned to each ONU from the OLT and the communication is carried out, so that it can be expected that a communication band is remarkably improved. One of methods of realizing the WDM-PON is a method in which one wavelength is assigned to each of an upstream signal and a downstream signal of each ONU, that is, the number of wavelengths used in one PON is made twice the maximum number of connected ONUs.

Besides, an example of initial setting of a path on a B-PON system is disclosed (see, for example, patent document 1).

[Patent document 1] U.S. Pat. No. 6,097,736
[Non-patent document 1] ITU-T recommendation G.984.3

SUMMARY OF THE INVENTION

In the WDM-PON, each ONU is required to use a specific wavelength in order to connect with the OLT and to start communication. For example, in the WDM-PON in which up to 32 ONUs can be connected, it is troublesome that at the installation of an ONU, an installer sets a wavelength other than those used in the OLT and the other ONUs. In view of easiness of the work, it is desirable that, rather than preparing 32 ONUs having different fixed wavelengths, ONUs each having a wavelength variable function automatically negotiate with the OLT to determine wavelengths and are connected. However, in the initial state, since the ONU can not know which wavelength is used to perform the connection, it is difficult for each ONU to negotiate with the OLT about which wavelength is used to carry out the communication.

In view of the above, the invention has an object to provide a passive optical network system and a wavelength assignment method in which in a PON system of WDM, at the time of initial setting, each ONU negotiates with an OLT and automatically obtains a wavelength usable for the ONU. Besides, the invention has an object to provide a passive optical network system and a wavelength assignment method in which wavelength resources are effectively used, and installation work is easy.

The above problem is solved by fixing one wavelength used for the negotiation of an assigned wavelength as a default, and a newly connected ONU first uses the wavelength for the negotiation. For that purpose, the OLT includes light sources of 32 wavelengths $\lambda d1$ to $\lambda d32$ usable for downstream communication. On the other hand, the ONU includes a wavelength variable filter capable of selectively receiving one of the 32 wavelengths $\lambda d1$ to $\lambda d32$ usable for the downstream communication, and a wavelength variable light source capable of selectively emitting light of one of 32 wavelengths $\lambda u1$ to $\lambda u32$ usable for upstream communication. When being connected, the ONU immediately changes the wavelength variable filter, so that the transmission wavelength (for example, $\lambda d32$) for the negotiation can be selectively received. Next, the ONU uses the transmission wavelength (for example, $\lambda u32$) for the negotiation to transmit a message of wavelength assignment negotiation to the OLT. The OLT uses $\lambda u32$ and selects, as a response to the message of the wavelength assignment negotiation, a wavelength other than $\lambda d32$ for downstream communication and a wavelength other than $\lambda u32$ for upstream communication from unused wavelengths, and transmits a wavelength use permission signal to the ONU. However, when the 32th ONU as the last ONU is connected, $\lambda d32$ is selected for the downstream communication, $\lambda u32$ is selected for the upstream communication, and the wavelength use permission signal is sent to the ONU. In this way, the negotiation of the use wavelength is performed between the OLT and the ONU, and the communication of user signals can be started using the notified wavelength.

Besides, according to another means for solving the above problem, a connected ONU sequentially changes a reception wavelength to detect an unused wavelength, and uses the unused wavelength to perform negotiation of wavelength, so that the problem can be solved. In more detail, the OLT emits light of only the wavelength under use for the communication with the ONU in which the wavelength assignment has been already completed, and keeps the light of the unused wavelength extinct. When being connected, the ONU immediately sequentially changes the wavelength variable filter, and measures the presence or absence of reception power of each of 32 wavelengths having possibility that they are used for downstream communication. The wavelength in which the reception power is zero can be regarded as the unused wavelength. Next, the ONU selects one from the wavelengths in which the reception power is zero, and for example, when the selected wavelength is $\lambda u10$, the ONU uses the $\lambda u10$ to transmit a message of wavelength assignment negotiation to the OLT, and voluntarily sets the reception wavelength variable filter so that a previously determined wavelength (for example, λd10) used as a pair with λu10 can be selectively received. The OLT causes the light source corresponding to λd10 to emit light, and uses λd10 to transmit a response to the message of wavelength assignment negotiation. In this way, the use wavelength is negotiated between the OLT and the ONU, and the wavelength used for the negotiation is used as it is, or it is possible to determine that another wavelength is assigned.

According to the invention, for example, in a WDM-PON system which includes an OLT, an optical fiber, an optical splitter, and plural ONUs and in which the ONU includes a wavelength control unit to variably control a transmission wavelength and a reception wavelength, the OLT includes transmission light sources the number of which is equal to the maximum number of connectable ONUs and which are different from each other in wavelength, a receiver capable of simultaneously receiving all signals of wavelengths the number of which is equal to the number of ONUs, a table for managing assigned wavelengths for the respective ONUs, and a control message transmission and reception unit for negotiating with the ONU about wavelength assignment, and the ONU includes a control message transmission and reception unit for negotiation of wavelength assignment, and a portion to store a wavelength to be set in the wavelength control unit based on a result of the negotiation by the control message.

Besides, in the invention, there is provided a reset unit to initialize, for example, a control wavelength by the wavelength control unit in the ONU to a previously determined value.

In the invention, for example, the ONU includes a portion to detect the presence or absence of a reception signal about all wavelengths usable for downstream communication of the WDM-PON system, and a portion to store a wavelength to be set in the wavelength control unit based on a result of the presence or absence of the reception signal.

In the invention, for example, the OLT includes a portion to detect the presence or absence of a reception signal about all wavelengths usable for upstream communication of the WDM-PON system, and a transmission control unit to stop signal transmission of a downstream wavelength corresponding to an upstream wavelength in which there is no reception signal based on a result of the presence or absence of the reception signal and a previously determined correspondence between a downstream wavelength and a upstream wavelength.

According to the invention, in a WDM-PON system which includes, for example, an OLT, an optical fiber, an optical splitter, and plural ONUs and in which the ONU includes a wavelength control unit to variably control a transmission wavelength and a reception wavelength, the OLT includes transmission light sources the number of which is equal to the maximum number of connectable ONUs and which are different from each other in wavelength, a receiver capable of simultaneously receiving all signals of wavelengths the number of which is equal to the number of ONUs, a table for managing assigned wavelengths for the respective ONUs, and a control message transmission and reception unit for negotiating with the ONU about wavelength assignment, at the time of initial start-up, the ONU uses one of wavelengths usable in the WDM-PON system to transmit a control message to request assignment of a wavelength used for communication with the OLT to the OLT, next, the OLT transmits a control message to notify a wavelength assigned to communication with the ONU based on the received control message, and the ONU changes its own transmission wavelength and reception wavelength based on the control message received from the OLT.

Besides, in the invention, for example, at the time of initial start-up, the ONU select an upstream wavelength assigned to a final ONU to which the OLT can be connected and transmits a control message to request assignment of the wavelength to the OLT, the OLT uses the upstream wavelength assigned to the final connectable ONU to receive the control message to request assignment of the wavelength used for communication with the OLT, the OLT uses a downstream wavelength assigned to the connectable final ONU to transmit a control message to notify a wavelength assigned to communication with the ONU, the ONU uses the downstream wavelength assigned to the connectable final ONU to receive the control message to assign the wavelength from the OLT, and the ONU changes its own transmission wavelength and reception wavelength based on the control message received from the OLT in the wavelength control unit.

Besides, in the invention, for example, the OLT detects the presence or absence of a reception signal about all wavelengths usable for the upstream communication of the WDM-PON system, stops signal transmission of a downstream wavelength corresponding to an upstream wavelength in which there is no reception signal based on a result of the presence or absence of the reception signal and a previously determined correspondence between a downstream wavelength and a upstream wavelength, at the time of initial start-up, the ONU detects the presence or absence of a reception signal about all wavelengths usable for the downstream communication, the ONU selects one wavelength from wavelengths detected to have no reception signal, and transmits a control message to request assignment of a wavelength used for communication with the OLT to the OLT, the OLT receives the control message, uses a downstream wavelength corresponding to the wavelength used for the control message from the ONU based on a previously determined correspondence between a downstream wavelength and an upstream wavelength, and transmits a control message to notify a wavelength assigned to communication with the ONU, the ONU uses a downstream wavelength corresponding to the wavelength used for the control message from the ONU based on the previously determined correspondence between the downstream wavelength and the upstream wavelength and receives the control message to assign the wavelength from the OLT, and the ONU changes its own transmission wavelength and reception wavelength based on the control message received from the OLT in the wavelength control unit.

According to the first solving means of this invention, there is provided a passive optical network system which comprises an optical line termination, an optical splitter, an optical fiber, and a plurality of optical network units connected to the optical line termination through the optical splitter and in which the optical line termination communicates with the optical network units in wavelength division multiplexing, wherein the system includes a plurality of wavelengths for communication between the optical line termination and the optical network units, a first wavelength among the plurality of wavelengths is previously determined as a wavelength for transmission and reception of a control message, and a second wavelength for communication with each of the optical network units is assigned among the plurality of wavelengths including the first wavelength, wherein the optical line termination includes:

a plurality of first transmitters having light source respectively which wavelengths are different from each other;

a plurality of first receivers to receive signals of a plurality of wavelengths;

a wavelength management table to manage information of the second wavelength assigned for communication with each of the optical network units for each of identifiers of the optical network units; and a first control unit to transmit and to receive a first and a second control messages for assigning wavelengths to and from the optical network unit and to assign the second wavelength for the communication with the optical network unit, wherein each of the optical network units includes:

a second receiver to receive a signal of a set wavelength;

a second transmitter to transmit a signal of a set wavelength;

a second control unit to transmit and receive the first and the second control message to assign the wavelengths through the second transmitter and the second receiver; and a wavelength control unit to variably control the transmission wavelength of the second transmitter and the reception wavelength of the second receiver to the first wavelength or the second wavelength, and wherein the optical network unit transmits the first control message to request assignment of the second wavelength to be used for communication between the optical line termination and the optical network unit itself to the optical line termination by the second transmitter previously set to the first wavelength, when the optical line termination receives the first control message from the optical network unit, refers to the wavelength management table, assigns the second wavelength, which is not assigned to other communications, to communication with the optical network unit, and transmits, by using the first wavelength, the second control message to notify information of assigned second wavelength to the optical network unit, the optical network unit receives the second control message by the second receiver previously set to the first wavelength, and sets the transmission wavelength of the second transmitter and the reception wavelength of the second receiver to the assigned second wavelength by the wavelength control unit based on the second control message, and the optical network unit and the optical line termination communicate with each other with the second wavelength.

According to the second solving means of this invention, there is provided a passive optical network system which comprises an optical line termination, an optical splitter, an optical fiber, and a plurality of optical network units connected to the optical line termination through the optical splitter and in which the optical line termination communicates with the optical network units in wavelength division multiplexing, wherein the optical line termination includes:

a plurality of first transmitters having light source respectively which wavelengths are different from each other;

a plurality of first receivers to receive signals of a plurality of wavelengths;

a wavelength management table to manage information of a wavelength assigned for communication with each of the optical network units for each of identifiers of the optical network units;

a first control unit to receive a control message to assign a wavelength from the optical network unit and to assign the wavelength for the communication between the optical line termination itself and the optical network unit; and a transmission enabling control unit to cause only a wavelength under communication with the optical network unit to be outputted by enabling or disabling each of the plurality of first transmitters, wherein each of the optical network units includes:

a second receiver to receive a signal of a set wavelength;

a second transmitter to transmit a signal of a set wavelength;

a reception power detection unit to detect reception power in the second receiver;

a second control unit to transmit the control message to assign the wavelength through the second transmitter; and a wavelength control unit to variably control a transmission wavelength of the second transmitter and a reception wavelength of the second receiver, wherein the second control unit of the optical network unit sequentially changes the reception wavelength of the second receiver by the wavelength control unit to each of transmission wavelengths of the plurality of first transmitters of the optical line termination, detects reception power of a downstream signal from the optical line termination to the optical network unit by the reception power detection unit for each wavelength, obtains a first downstream wavelength not used for other communications based on the reception power, sets the reception wavelength of the second receiver to the first downstream wavelength by the wavelength control unit, and sets the transmission wavelength of the second transmitter to a first upstream wavelength paired with the first downstream wavelength, and transmits, by using the first upstream wavelength, a control message to request assignment of a wavelength to be used for communication with the optical line termination to the optical line termination, wherein the optical line termination according to receiving the control message, assigns the first downstream wavelength and the first upstream wavelength to communication with the optical network unit, or refers to the wavelength management table to assign a second downstream wavelength and a second upstream wavelength, which are not used for other communications, to communication with the optical network unit, and enables the first transmitter corresponding to the first downstream wavelength or the second downstream wavelength by the transmission enabling control unit, and wherein the optical network unit and the optical line termination communicate with each other with the first downstream wavelength and the first upstream wavelength, or the second downstream wavelength and the second upstream wavelength.

According to the third solving means of this invention, there is provided a wavelength assignment method in a passive optical network system which includes an optical line termination, an optical splitter, an optical fiber, and a plurality of optical network units connected to the optical line termination through the optical splitter and in which the optical line termination communicates with the optical network units in wavelength division multiplexing, wherein the system includes a plurality of wavelengths for communication between the optical line termination and the optical network units, a first wavelength among the plurality of wavelengths is previously determined as a wavelength for transmission and reception of a control message, and the wavelength assignment method is for assigning a second wavelength for communication with each of the optical network units among the plurality of wavelengths including the first wavelength, and wherein the optical network unit transmits a first control message to request assignment of the second wavelength to be used for communication between the optical line termination and the optical network unit itself to the optical line termination by a transmitter previously set to the first wavelength, when the optical line termination receives the first control message from the optical network unit, the optical line termination refers to a wavelength management table for managing information of the second wavelength assigned for communication with each of the optical network units, assigns the second wavelength, which is not assigned to other communications, to communication with the optical network unit, and transmits, by using the first wavelength, a second control message to notify the information assigned second wavelength to the optical network unit, the optical network unit receives the second control message by a receiver previously set to the first wavelength, and sets a transmission wavelength of a transmitter and a reception wavelength of the receiver to the assigned second wavelength based on the second control message, and the optical network unit and the optical line termination communicate with each other with the second wavelength.

According to the forth solving means of this invention, there is provided a wavelength assignment method in a passive optical network system which includes an optical line termination, an optical splitter, an optical fiber, and a plurality of optical network units connected to the optical line termination through the optical splitter and in which the optical line termination communicates with the optical network units in wavelength division multiplexing, wherein the optical network unit sequentially changes a reception wavelength of a receiver of the optical network unit to each of transmission wavelengths of a plurality of transmitters of the optical line termination, detects reception power of a downstream signal from the optical line termination to the optical network unit for each wavelength, obtains a first downstream wavelength not used for other communications based on the reception power, sets the reception wavelength of the receiver of the optical network unit to the obtained first downstream wavelength, and sets the transmission wavelength of the transmitter of the optical network unit to a first upstream wavelength paired with the first downstream wavelength, and transmits, by using the first upstream wavelength, a control message to request assignment of a wavelength to be used for communication with the optical line termination to the optical line termination, wherein the optical line termination according to receiving the control message, assigns the first downstream wavelength and the first upstream wavelength to communication with the optical network unit, or refers to a wavelength management table for managing wavelength information assigned for communication with each of the optical network units for each of identifiers of the optical network units, assigns a second downstream wavelength and a second upstream wavelength, which are not used for other communications, to communication with the optical network unit, and enables the transmitter of the optical line termination corresponding to the first downstream wavelength or the second downstream wavelength, and wherein the optical network unit and the optical line termination communicate with each other with the first downstream wavelength and the first upstream wavelength, or the second downstream wavelength and the second upstream wavelength.

According to the invention, it is possible to provide a passive optical network system and a wavelength assignment method in which in a PON system of WDM, at the time of initial setting, each ONU negotiates with an OLT and automatically obtains a wavelength usable for the ONU. Besides, according to the invention it is possible to provide a passive optical network system and a wavelength assignment method in which wavelength resources are effectively used, and installation work is easy.

BRIEF DESCRIPTION OF THE DRAWINGS

FIG. 5 shows a structural example of a connection management table of the OLT.

FIG. 6 shows a structural example of a wavelength management table.

FIGS. 12A to 12C show transition examples (1) of a wavelength management table.

FIGS. 13A to 13C show transition examples (2) of the wavelength management table.

DESCRIPTION OF THE PREFERRED EMBODIMENTS OF THE INVENTION

1. First Embodiment (System Structure)

Figure 1:
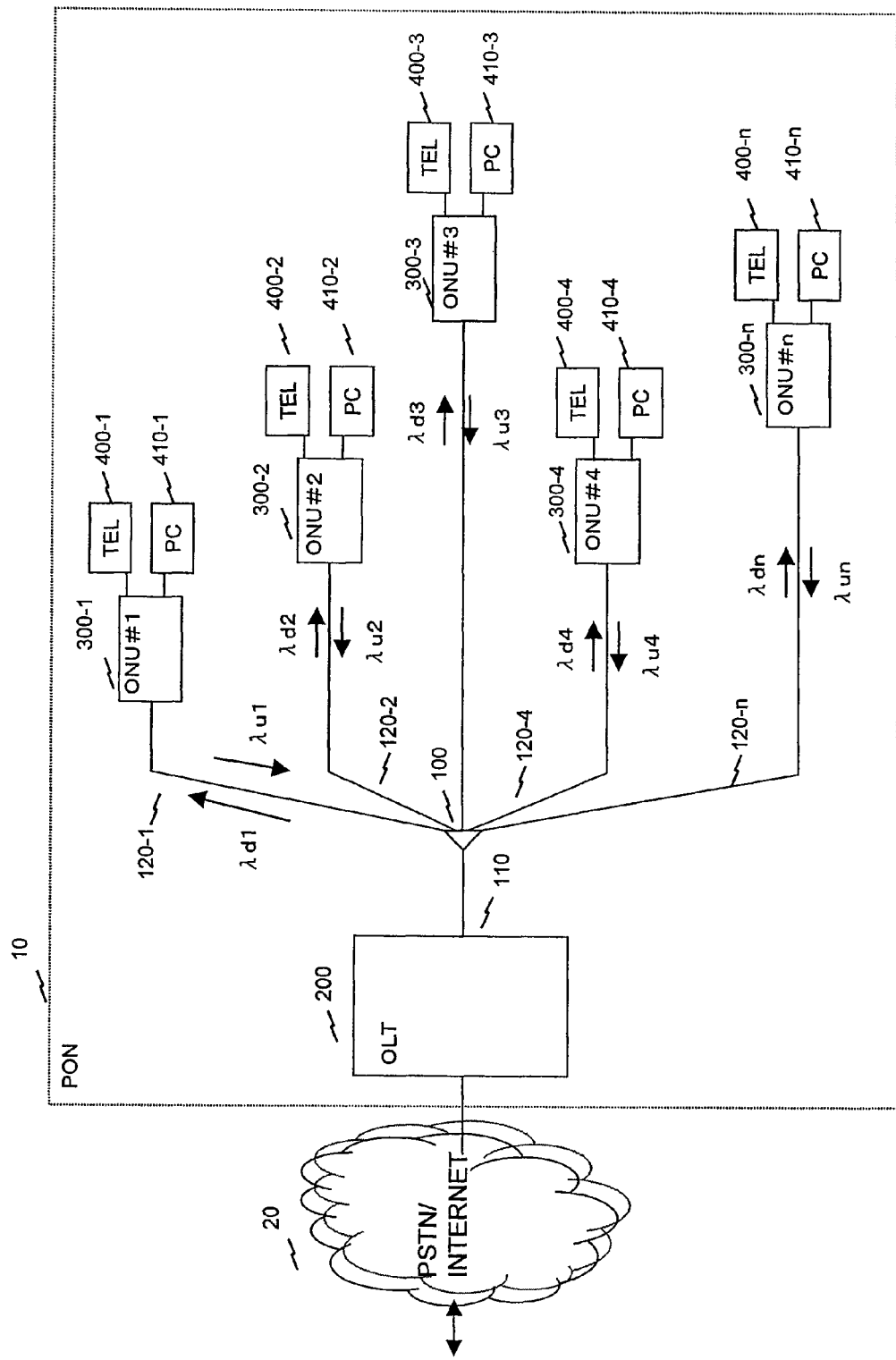
FIG. 1 is a structural view of an optical access network (PON).

FIG. 1 shows a structure of an optical access network to which this embodiment is applied.

A PON 10 includes an optical splitter 100, a main fiber 110, plural subsidiary fibers 120, an OLT 200 and ONUs (or ONTs) 300. The PON 10 is connected to a PSTN/Internet 20, and transmits/receives data. For example, a telephone 400 and a personal computer 410 are connected to the ONU 300. For example, 32 ONUs 300 can be connected to the OLT 200 through the one main fiber 110, the optical splitter 100 and the subsidiary fibers 120. FIG. 1 shows five ONUs which are different from each other in wavelength used for communication with the OLT. In the illustrated example, the ONU 300-1 uses wavelengths λd1 and λu1, the ONU 300-2 uses λd2 and λu2, the ONU 300-4 uses λd4 and λu4, and the ONU 300-n uses λdn and λun. Incidentally, in this embodiment, λd denotes a wavelength of a downstream signal, and λu denotes a wavelength of an upstream signal. A signal transmitted in a direction (downstream direction) from the OLT 200 to the ONU 300 is wavelength-multiplexed with a signal to each ONU 300 and is transmitted. The ONU 300 receives the signal, confirms whether the signal is for the ONU itself or not by selecting a wavelength determined in this embodiment, and sends the signal which is for the ONU itself to the telephone 400 or the personal computer 410 based on the address of the signal. Besides, in a direction (upstream direction) from the ONU 300 to the OLT 200, signals transmitted from the ONU 300-1, the ONU 300-2, the ONU 300-3, the ONU 300-4 and the ONU 300-n are wavelength-multiplexed after passing through the optical splitter 100, and reach the OLT 200.

Figure 2:
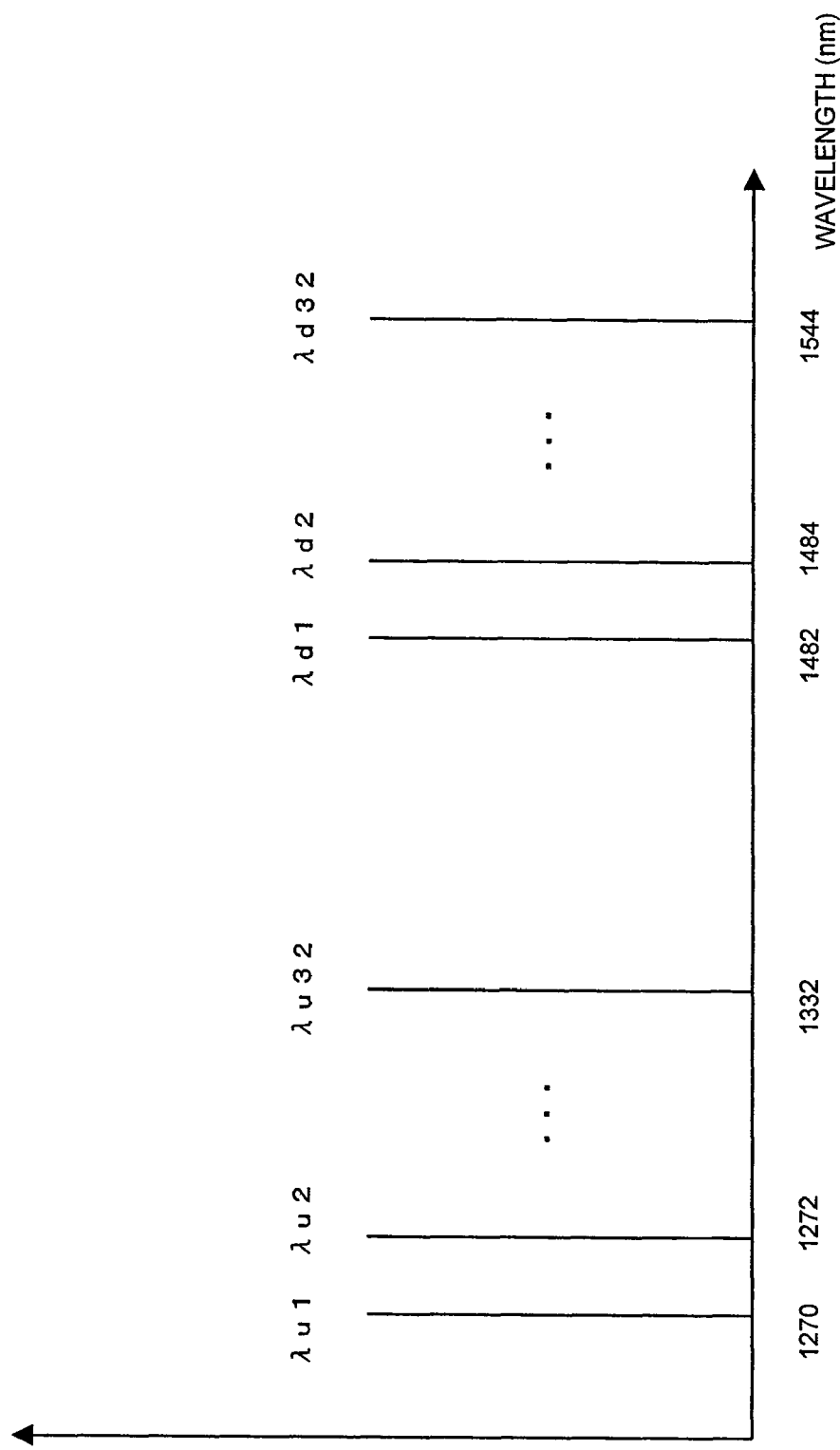
FIG. 2 is an explanatory view of wavelength assignment.

FIG. 2 shows an example of wavelength arrangement in this embodiment.

For example, in the WDM-PON in which up to 32 ONUs are connected, in general, a 1300 nm wavelength band and a 1500 nm wavelength band can be used for signal transmission. It is recommended in the ITU-T recommendation G.983.1 that specifically, 1260 nm to 1360 nm is used for the 1300 nm wavelength band, and 1480 nm to 1580 nm is used for the 1500 nm wavelength band. In order to cause 32 wavelengths to be contained in each band, values from 1270 nm to 1332 nm at intervals of 2 nm can be used for the wavelength (λu1 to λu32) of the upstream signal, and values from 1482 nm to 1544 nm at intervals of 2 nm can be used for the wavelength (λd1 to λd32) of the downstream signal.

Figure 3:
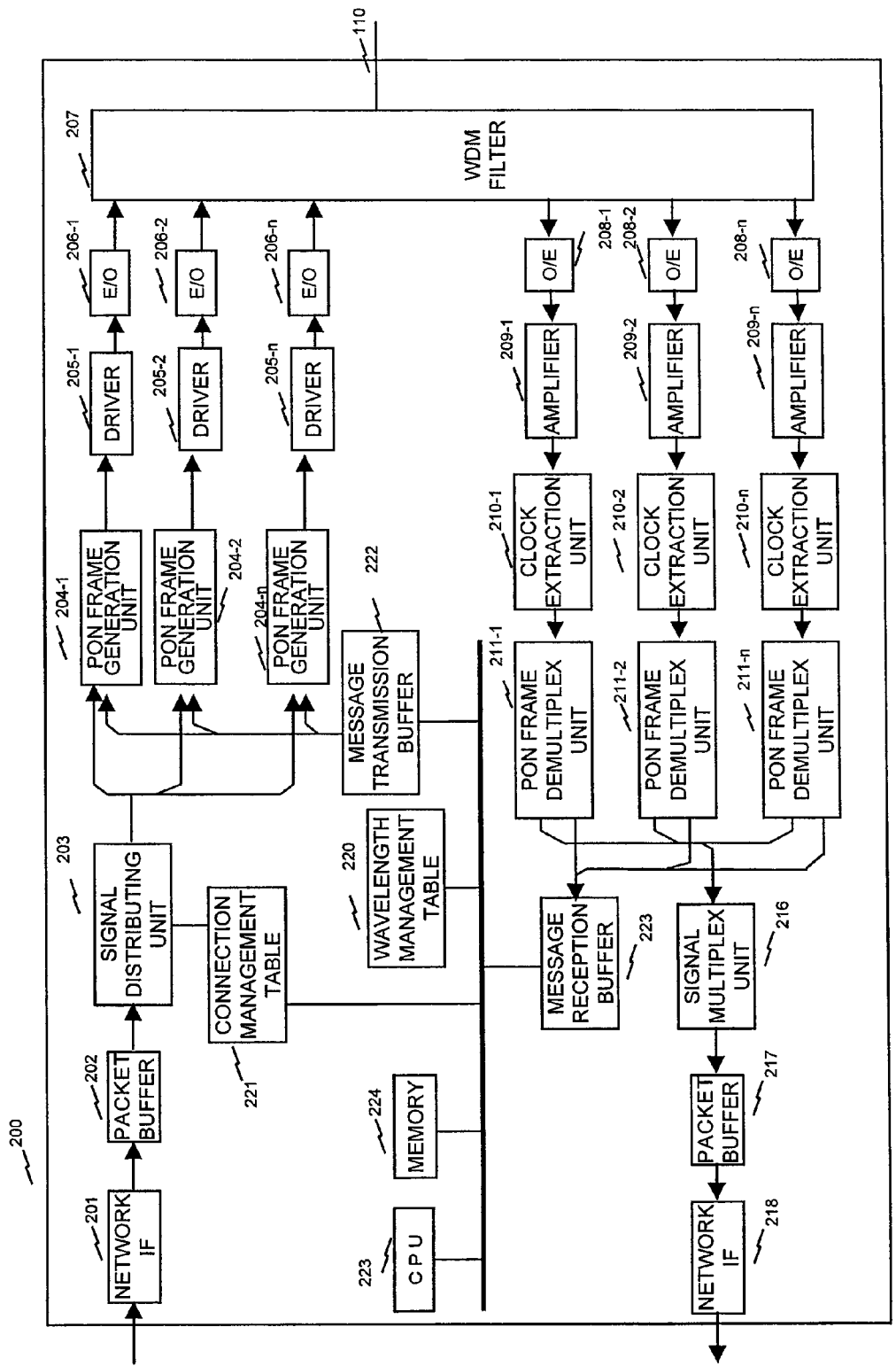
FIG. 3 shows a structural example of an OLT in a first embodiment.

FIG. 3 shows a structural example of the OLT 200 of this embodiment.

The OLT 200 includes, for example, a network IF 201, a packet buffer 202, a signal distributing unit 203, a connection management table 221, PON frame generation units 204, drivers 205, E/Os 206, a WDM filter 207, O/Es 208, amplifiers 209, clock extraction units 210, PON frame demultiplex units 211, a signal multiplex unit 216, a packet buffer 217, a network IF 218, a CPU (first control unit) 223, a memory 224, a message transmission buffer 222, a message reception buffer 223, and a wavelength management table 220.

The network IF 201 receives a signal from the PSTN/Internet 20. This signal is once stored in the packet buffer 202. The signal distributing unit 203 reads a label given to the packet signal, reads the corresponding ONU number (ONU-ID or PON-ID) in the connection management table 221, and transfers the packet signal to the corresponding block in the PON frame generation units 204-1 to 204-n.

When the maximum number of connectable ONUs is n, the OLT 200 includes the n PON frame generation units 204, the n drivers 205 and the n E/Os 206 (these are called first transmitters). The PON frame generation unit 204 adds an overhead in a PON section and generates an electric transmission signal. The driver 205 current-drives the E/O 206 to convert an electric signal into an optical signal, and transmits the signal to the ONU 300 through the WDM filter 207 and the fiber 110.

On the other hand, when the maximum number of connectable ONUs is n, the OLT 200 includes the n O/Es 208, the n amplifiers 209, the n clock extraction units 210 and the n PON frame demultiplex units 211 (these are called first receivers).

A signal received from the ONU 300 through the WDM filter 207 and separated for each wavelength is converted into an electric signal by the O/E 208. Besides, the signal is amplified by the amplifier 209, and is subjected to retiming by the clock extraction unit 210. The overhead is separated by the PON frame demultiplex unit 211, and the signal is outputted from the network IF 218 to the network side through the signal multiplex unit 216 and the packet buffer 217.

Incidentally, the OLT 200 can include, for example, first transmitters and first receivers the number of which is equal to the maximum number of ONUs connectable to the OLT 200. In this embodiment, although one downstream wavelength and one upstream wavelength are assigned to one ONU 300, plural downstream wavelengths and plural upstream wavelengths may be assigned to one ONU. In this case, the ONU 300 includes plural second transmitters and plural second receivers, and the OLT 200 can include plural first transmitters and plural first receivers the number of which is larger than the number of connected ONUs.

The CPU 223 and the memory 224 are paired, and execute monitor control of respective parts of the inside of the OLT 200. Besides, the CPU 223 performs setting to correlate a label of a packet of the connection management table 221 with the number of a destination ONU in accordance with an instruction from a higher level. The CPU 223 uses the message transmission buffer 222 and the message reception buffer 223 to send/receive a wavelength assignment message to/from each of the ONU 300-1 to ONU 300-n, and registers the assigned wavelength for each ONU into the wavelength management table 220.

FIG. 5 shows a structural example of the connection management table 221.

The connection management table 221 includes an entry to store a serial number of the ONU 300, an entry to store a connection label, and an entry to store an ONU-ID. Before the start-up of the ONU 300, for example, by the instruction of the CPU 223, the value of the corresponding connection label is set for each serial number. As the connection label, for example, the value of VLAN (Virtual Local Area Network)-ID can be used. For example, with respect to the value of "A0000001" as the serial number of the ONU, the value of 1 of the VLAN-ID is set. Thereafter, when the ONU 300 is started, the serial number of the ONU and the ONU-ID are automatically made to correspond to each other. The CPU 223 sets the corresponding ONU-ID for the serial number of the ONU. For example, with respect to the value of "A0000001" as the serial number, 1 is set as the value of the ONU-ID.

As described before, the signal distributing unit 203 reads the connection label (for example, VLAN-ID) given to the packet signal, refers to the connection management table 221 to read the corresponding ONU number, and transfers the packet signal to the corresponding block in the PON frame generation units 204-1 to 204-n. The PON frame generation units 204-1 to 204-n correspond to, for example, 1 to n of the ONT-ID. For example, the packet signal to which 1 is given as the value of the VLAN-ID is distributed to the PON frame generation unit 204-1 corresponding to the value 1 of the ONU-ID.

FIG. 6 shows a structural example of the wavelength management table 220.

The wavelength management table 220 includes an entry of an ONU-ID, an entry of a serial number, an entry of a downstream wavelength and an entry of an upstream wavelength, and respective values are registered. When the ONU 300 has not been registered or not been connected, for example, "unregistered" is set in the entry of the serial number. Besides, the value of "unused" is set in each of the entry of the downstream wavelength and the entry of the upstream wavelength. Besides, the values of λd32 and λu32 are respectively set in the entry of the downstream wavelength and the entry of the upstream wavelength of the row of the ONU#32. However, until the ONU#32 is registered, the upstream wavelength and the downstream wavelength of the ONU#32 are used in common. Each time the ONU 300 is connected, the OLT 200 acquires the serial number of the ONU 300 by a wavelength request signal (the details will be described later) from the ONU 300. Besides, the OLT 200 refers to the wavelength management table 220 to retrieve the unregistered ONU-ID and the unused wavelength, determines the ONU-ID and the wavelength to be used for assignment, and sets the acquired serial number to the row of the assigned ONU-ID in the wavelength management table 220.

Figure 4:
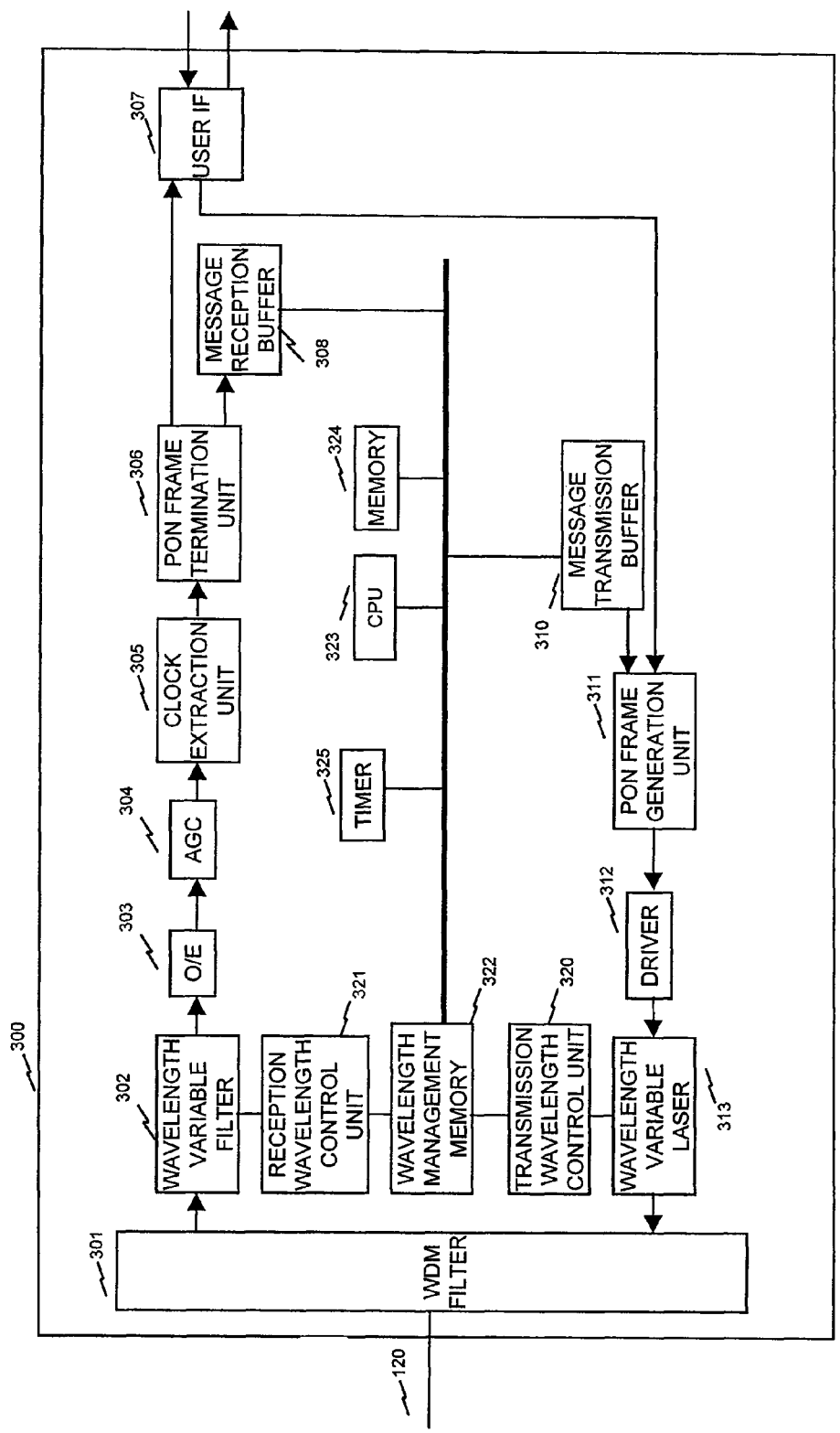
FIG. 4 shows a structural example of an ONU in the first embodiment.

FIG. 4 shows a structural example of the ONU 300 of the embodiment.

The ONU 300 includes, for example, a WDM filter 301, a wavelength variable filter 302, an O/E 303, an AGC (Automatic Gain Control) 304, a clock extraction unit 305, a PON frame termination unit 306, a user IF 307, a PON frame generation unit 311, a driver 312, a wavelength variable laser 313, a CPU (second control unit) 323, a memory 324, a wavelength management memory 322, a reception wavelength control unit 321, a transmission wavelength control unit 320, a timer 325, a message reception buffer 308, and a message transmission buffer 310.

Incidentally, for example, the wavelength variable filter 302, the O/E 303, the AGC 304, the clock extraction unit 305, and the PON frame termination unit 306 are called a second receiver. Besides, the PON frame generation unit 311, the driver 312, the wavelength variable laser 313 are called a second transmitter.

An optical signal received from the subsidiary fiber 120 is wavelength-separated by the WDM filter 301, and one of the downstream wavelengths λd1 to λd32 is selectively transmitted through the wavelength variable filter 302. The optical signal is converted into an electric signal by the E/O 302, and the control is performed in the AGC 304 so that the amplitude value becomes constant. Besides, the retiming is performed in the clock extraction unit 305, the overhead of the PON section is separated in the PON frame termination unit 306, and the user signal is sent to the user IF 307 and is outputted.

Besides, a signal inputted from the user IF 307 is added with the overhead of the PON section by the PON frame generation unit 311 and is assembled. The driver 312 current-drives the wavelength variable laser 313 so that the assembled signal is converted into an optical signal of a wavelength set by the transmission wavelength control unit 320, and the signal is transmitted to the subsidiary fiber 120 through the WDM filter 301.

The CPU 323 and the memory 324 are paired to monitor and to control each block in the ONU 300. For example, immediately after the ONU is started or the ONU is connected to a fiber, the CPU 323 performs a reset while a previously determined wavelength in the wavelength management memory 322, for example, a downstream wavelength λd32 and an upstream wavelength λu32 are made initial values. The reception wavelength control unit 321 sets the wavelength of the wavelength variable filter 302 based on the value stored in the wavelength management memory 322. The transmission wavelength control unit 320 sets the wavelength of the wavelength variable laser 313 based on the value stored in the wavelength management memory 322. While referring to the timer 325, the CPU 323 uses the message reception buffer 308 and the message transmission buffer 310 to send/receive a wavelength assignment message to/from the OLT 200, and sets its own assigned wavelength in the wavelength management memory 322.

(Signal Format)

FIGS. 7A to 7C and FIGS. 8A and 8B show signal formats in this embodiment.

Figure 7A:
FIGS. 7A to 7C show structural examples of a user signal transfer frame, a wavelength request signal, and a wavelength assignment signal.

FIG. 7A shows a structural example of a format of a user signal transfer frame after the start-up of the ONU in this embodiment.

A user signal 1003 includes, for example, a frame synchronization pattern 2001, a PLOAM (Physical Layer Operation Administration and Maintenance) field 2002, an OMCI (ONT Management and Control Interface) field 2003, and a frame payload 2004.

In the WDM-PON, since the communication after the start-up of the ONU is performed in one-to-one connection, a typical frame structure of a 125 micro-second period can be applied to a signal. The frame synchronization pattern 2001 is used for frame synchronization. The PLOAM field 2002 is an area used for monitor control of a physical layer, and its specific example is described in, for example, ITU-T recommendation G.983.1. The OMCI field 2003 is an area in which the inner control information of the ONU can be monitored and controlled, and its specific example is described in ITU-T recommendation G.983.2. The frame payload 2004 is an area for transmitting a user signal, and mapping of the user signal, such as an Ethernet (registered trademark) signal or an ATM signal, can be carried out.

Figure 7B:
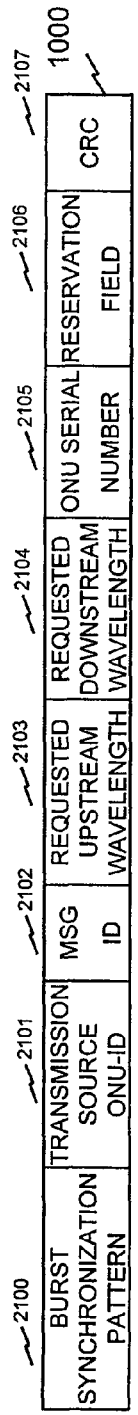

FIG. 7B shows a structural example of a wavelength request signal 1000 in this embodiment.

Before the start-up of the ONU, since plural ONUs 300 share the wavelength λu32 for wavelength assignment, in order to reduce the possibility of collision of signals from the plural ONUs 300, it is desirable that the signal for wavelength request is a burst signal.

The wavelength request signal 1000 includes, for example, a burst synchronization pattern 2100, a transmission source ONU-ID 2101, a message ID (MSG-ID) 2102, a requested upstream wavelength 2103, a requested downstream wavelength 2104, an ONU serial number 2105, a reservation field 2106, and a CRC 2107.

The burst synchronization pattern 2100 is a sufficiently long pattern so that the OLT 200 can establish burst synchronization, and can be made the length of several ten to several thousand bits according to the performance of the receiver. At the time of initial connection of the ONU 300, a broadcast code is put in the transmission source ONU-ID 2101. In the case of restart of the ONU 300, the past ONU-ID is put therein, and can also urge the OLT 200 to assign the same wavelength as the past. The MSG-ID 2102 is a kind code indicating that this signal is a wavelength request signal. In this embodiment, a specific value is not required for the requested upstream wavelength 2103 and the requested downstream wavelength 2104. A dummy code may be put, or another arbitrary wavelength may be put.

The ONU serial number 2105 is a number which the ONU 300 uniquely has, and is a code of 8 bytes according to ITU-T recommendation G.983.1. This information is used in order for the OLT 200 to manage the wavelength assignment of the ONU 300. The reservation field 2106 is a space area used to adjust the length of a signal to the length of the PLOAM message defined by ITU-T recommendation G.983.1, and can also be used for a future expansion use. The Cyclic Redundancy Check (CRC) 2107 is given in order for the OLT 200 to confirm the presence or absence of an error of message content, and the OLT 200 does not use an erroneous message.

Figure 7C:
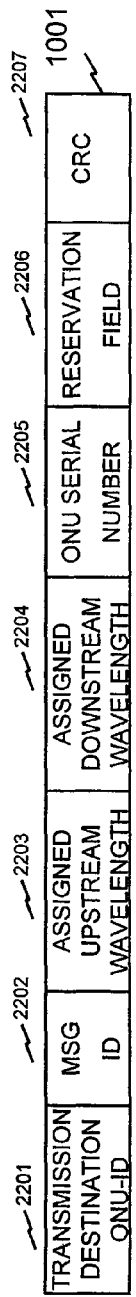

FIG. 7C shows a structural example of a wavelength assignment signal 1001 in this embodiment.

Although the wavelength assignment signal 1001 is used in the downstream direction, in the PON, since the downstream signal has a form of broadcast from one OLT 200 to all ONUs 300, a signal format at the normal time, which is described in FIG. 7A, can be used. For example, necessary information is made a message in the PLOAM field 2002 in FIG. 7A and has only to be sent.

When the wavelength assignment signal 1001 is constructed using the PLOAM message, there are included, for example, a transmission destination ONU-ID 2201, an MSG-ID 2202, an assigned upstream wavelength 2203, an assigned downstream wavelength 2204, an ONU serial number 2205, a reservation field 2206, and a CRC 2207.

The assignment ONU-ID is put in the transmission destination ONU-ID 2101. A kind code indicating that this signal is a wavelength assignment signal is put in the MSG-ID 2102. Wavelengths assigned by the OLT 200 are coded and put in the assigned upstream wavelength 2203 and the assigned downstream wavelength 2204. The ONU serial number 2205 is a number which the ONU 300 uniquely has. This information is used in order for the ONU 300 to confirm whether the message is for itself. The reservation field 2206 is a space area for adjusting the length of the signal to the length of the PLOAM message defined by ITU-T recommendation G.983.1, and can also be used for a future expansion use. The CRC 2207 is given in order for the ONU 300 to confirm the presence or absence of an error of the message content, and the ONU 300 does not use an erroneous message.

Figure 8A:
FIGS. 8A and 8B show structural example of a wavelength confirmation signal and a control wavelength notification signal.

FIG. 8A shows a structural example of a wavelength confirmation signal 1002 in this embodiment.

Although the wavelength confirmation signal 1002 is in the upstream direction, since the wavelength assignment has been performed at this stage, a signal can be transmitted using the PLOAM message in the signal format at the normal time described in FIG. 7A. When the wavelength confirmation signal is constructed using the PLOAM message, there are included, for example, a transmission source ONU-ID 2301, an MSG-ID 2302, an assigned upstream wavelength 2303, an assigned downstream wavelength 2304, an ONU serial number 2305, a reservation field 2106, and a CRC 2107. The MSG-ID 2302 is a code to indicate that this signal is a wavelength confirmation signal. By this signal, the ONU 300 can notify the OLT 200 that the wavelength setting is completed and the communication of a user signal can be started. The others are the same as the above.

Figure 8B:
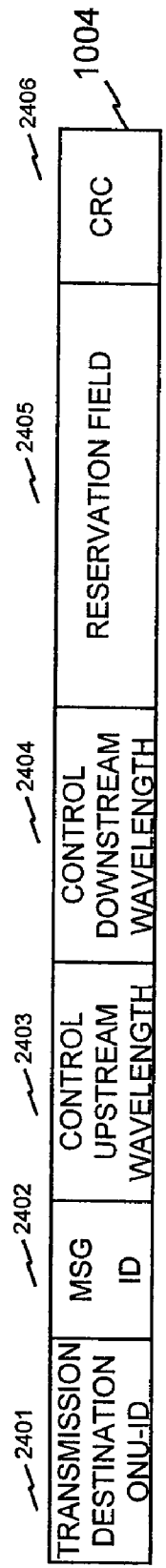

FIG. 8B shows a structural example of a control wavelength notification signal 1004 in this embodiment.

When the control wavelength notification signal 1004 is constructed using the PLOAM message, there are included, for example, a transmission destination ONU-ID 2401, an MSG-ID 2402, a control upstream wavelength 2403, a control downstream wavelength 2404, a reservation area 2405, and a CRC 2406. The transmission destination ONU-ID 2401 is a broadcast code. The MSG-ID 2402 is a code to indicate that this signal is a control wavelength notification signal. This signal can be used for a use in which the OLT 200 uses $\lambda d32$, and notifies the ONU 300 immediately after the startup which wavelength is used as the control wavelength.

(Operation)

Figure 9:
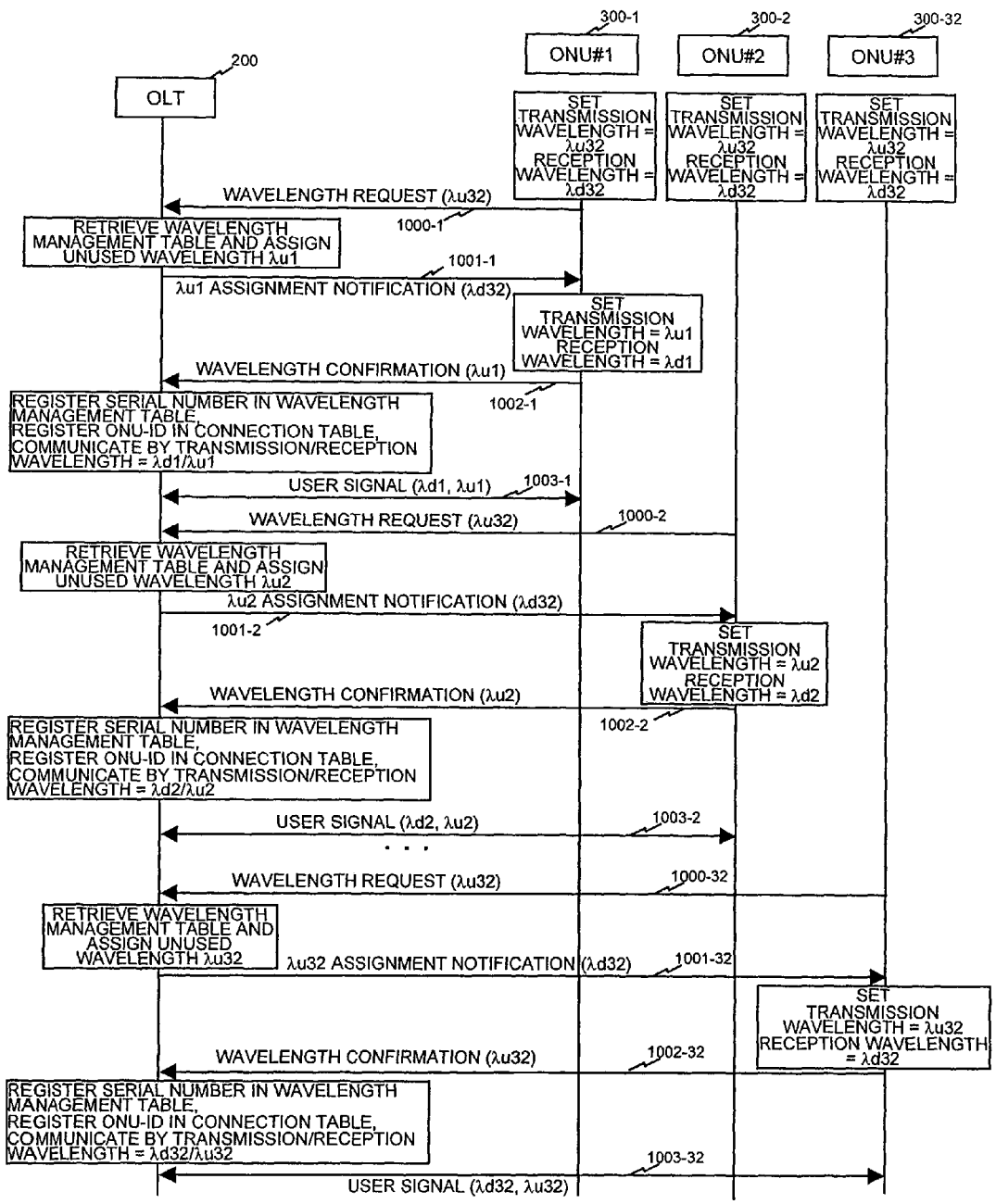
FIG. 9 is a sequence view of a wavelength assignment in the first embodiment.

FIG. 9 is a sequence view of an operation of this embodiment.

This drawing shows an operation example in which the ONU 300-1 (ONU#1), the ONU 300-2 (ONU#2) and the ONU 300-32 (ONU#32) are connected to the OLT 200 in sequence. However, the ONU#3 to ONU#31 are omitted in this drawing. Besides, the sequence may be an arbitrary sequence.

First, the wavelength assignment operation of the first connected ONU 300-1 will be described. Immediately after the power is turned on, the ONU 300-1 sets its own transmission wavelength to a management wavelength (first wavelength) $\lambda u32$ based on a previous arrangement, and transmits a wavelength assignment request signal (first control message) 1000-1. For example, the reception wavelength control unit 321 of the ONU 300-1 changes the wavelength of the wavelength variable filter 302 to the reception wavelength $\lambda d32$ stored in the wavelength management memory 322. Besides, the reception wavelength control unit 321 of the ONU 300-1 changes the wavelength of the wavelength variable laser 313 to the transmission wavelength $\lambda u32$ stored in the wavelength management memory 322. For example, the CPU 323 generates the wavelength assignment request signal 1000-1 shown in FIG. 7B, and uses the wavelength $\lambda u32$ to transmits it to the OLT 200 by the wavelength variable laser 313 through the message transmission buffer 310.

On the other hand, the OLT 200 always monitors the received control signal using the wavelength $\lambda u32$, and receives the wavelength assignment request signal 1001-1 from the ONU 300. That the received control signal is the wavelength assignment request signal can be identified by the MSG-ID 2102. The OLT 200 (for example, CPU 223) refers to the wavelength management table 220, and assigns, from the entry in which the serial number has not been registered, for example, downstream wavelength information $\lambda d1$ and upstream wavelength information $\lambda u1$ a second wavelength in this specification includes both of the upstream wavelength and the downstream wavelength, which is the smallest number, as the wavelength for the ONU 300-1. Besides, the OLT 200 (for example, the CPU 223) generates the control signal (wavelength assignment notification, second control message) 1001-1 for assigning the wavelength information $\lambda d1$ and $\lambda u1$, and uses the wavelength $\lambda d32$ to transmit it to the ONU 300-1 through the message transmission buffer 222 and the PON frame generation unit 204-1 corresponding to the management wavelength $\lambda d32$.

The ONU 300-1 sets its own reception wavelength to $\lambda d32$, and receives the control signal 1001-1. The ONU 300-1 sets its own transmission wavelength to $\lambda u1$ and sets the reception wavelength to $\lambda d1$ based on the content of the received control signal 1001-1. For example, the CPU 323 of the ONU 300-1 stores the upstream wavelength information $\lambda u1$ and the downstream wavelength information $\lambda d1$ included in the received control signal into the wavelength management memory 322. Besides, the reception wavelength control unit 321 changes the wavelength of the wavelength variable filter 302 to the wavelength $\lambda d1$ stored in the wavelength management memory 322. Besides, the reception wavelength control unit 321 changes the wavelength of the wavelength variable laser 313 to the wavelength $\lambda u1$ stored in the wavelength management memory 322.

Next, the ONU 300-1 notifies the OLT 200 by the control signal (wavelength confirmation signal) 1002-1 that its own wavelength setting is completed. For example, the CPU 323 of the ONU 300-1 generates the wavelength confirmation signal 1002-1 shown in FIG. 7C, and transmits it to the OLT 200 by the wavelength variable laser 313 through the message transmission buffer 310. Here, in the wavelength variable laser 313, the transmission wavelength is set to $\lambda u1$, and the wavelength confirmation signal 1002-1 is transmitted with the wavelength $\lambda u1$.

The OLT 200 receives the wavelength confirmation signal 1002-1 from the ONU 300-1. Here, the signal is received by the O/E 208-1 corresponding to the wavelength $\lambda u1$. The CPU 223 registers the serial number of the ONU 300-1 into the wavelength management table 220 correspondingly to the assigned wavelength (FIG. 12B). As the serial number, one included in the received wavelength confirmation signal or wavelength request signal may be used. Besides, the CPU 223 registers the ONU-ID into the connection management table 221. For example, based on the serial number of the ONU 300-1, a reference is made to the connection management table 221, and the assigned ONU-ID is registered correspondingly to the serial number. Here, as registered in the wavelength management table 220, since the ONU-ID is "1", as in the example of FIG. 5, the ONU-ID "1" is registered correspondingly to the serial number "A000 0001" of the ONU 300-1. Incidentally, the ONU-ID can be assigned at a suitable timing.

The OLT 200 (signal distributing unit 203) reads the corresponding ONU-ID in the connection management table 221 based on the label given to the packet (user signal) received from, for example, the PSTN/Internet 20, and distributes the user signal to the PON frame generation unit 204-1 corresponding to the ONU-ID. The ONU-ID corresponds to the wavelength as shown in the wavelength management table, and the user signal 1003-1 is transmitted to the ONU 300-1 with the downstream wavelength $\lambda d1$ assigned to the ONU 300-1. On the other hand, the ONU 300-1 uses the wavelength $\lambda u1$ to transmit the user signal 1003-1, so that the bidirectional communication is established.

Next, the wavelength assignment operation of the connected ONU 300-2 will be described.

Similarly to the foregoing ONU 300-1, the ONU 300-2 sets its own transmission wavelength to $\lambda u32$ based on the previous arrangement immediately after the power is turned on, and transmits a wavelength assignment request signal 1000-2. On the other hand, the OLT 200 uses the wavelength $\lambda u32$ to always monitor the received control signal, and after receiving the wavelength assignment request signal 1001-2, the OLT refers to the wavelength management table 220, assigns, for example, the downstream wavelength $\lambda d2$ and the upstream wavelength $\lambda u2$, which is the smallest number at this point, as the wavelength for #2 from the unregistered entry, and transmits a control signal 1001-2.

The ONU 300-2 sets its own reception wavelength to $\lambda d32$, and receives the control signal 1001-2. The ONU 300-2 sets its own transmission wavelength to $\lambda u2$ and sets the reception wavelength to $\lambda d2$ based on the content of the received control signal 1001-2. Next, the ONU 300-2 notifies the OLT 200 by the control signal 1002-2 that its own wavelength setting is completed.

Similarly to the above, the OLT 200 registers the serial number of the ONU 300-2 into the wavelength management table 220, and registers the ONU-ID into the connection management table 221. FIG. 12C shows an example of the wavelength management table 220 in which the serial number of the ONU 300-2 is registered.

The OLT 200 refers to the connection table 221 and distributes the user signal given the connection label of the ONU 300-2 according to the corresponding ONU-ID. Here, the signal is distributed to the PON frame generation unit 204-2, and is transmitted using the wavelength $\lambda d2$. On the other hand, the ONU 300-2 uses the wavelength $\lambda u2$ to transmit the user signal, so that the bidirectional communication between the OLT 200 and the ONU 300-2 is established.

Hereinafter, the wavelength setting to the other ONU connected to the OLT 200 is also similarly carried out, and in the ONU 300-32, the wavelength assignment is performed using the management wavelengths $\lambda u32$ and $\lambda d32$, and the same $\lambda u32$ and $\lambda d32$ are assigned for communication and the operation is ended. FIG. 13A shows an example of the wavelength management table at the time when all communicable wavelengths are assigned. Here, although the wavelengths $\lambda d32$ and $\lambda u32$ are used for the communication with the ONU 300-32 of the serial number "A000 0020", they can be used also as the management wavelengths.

Figure 10:
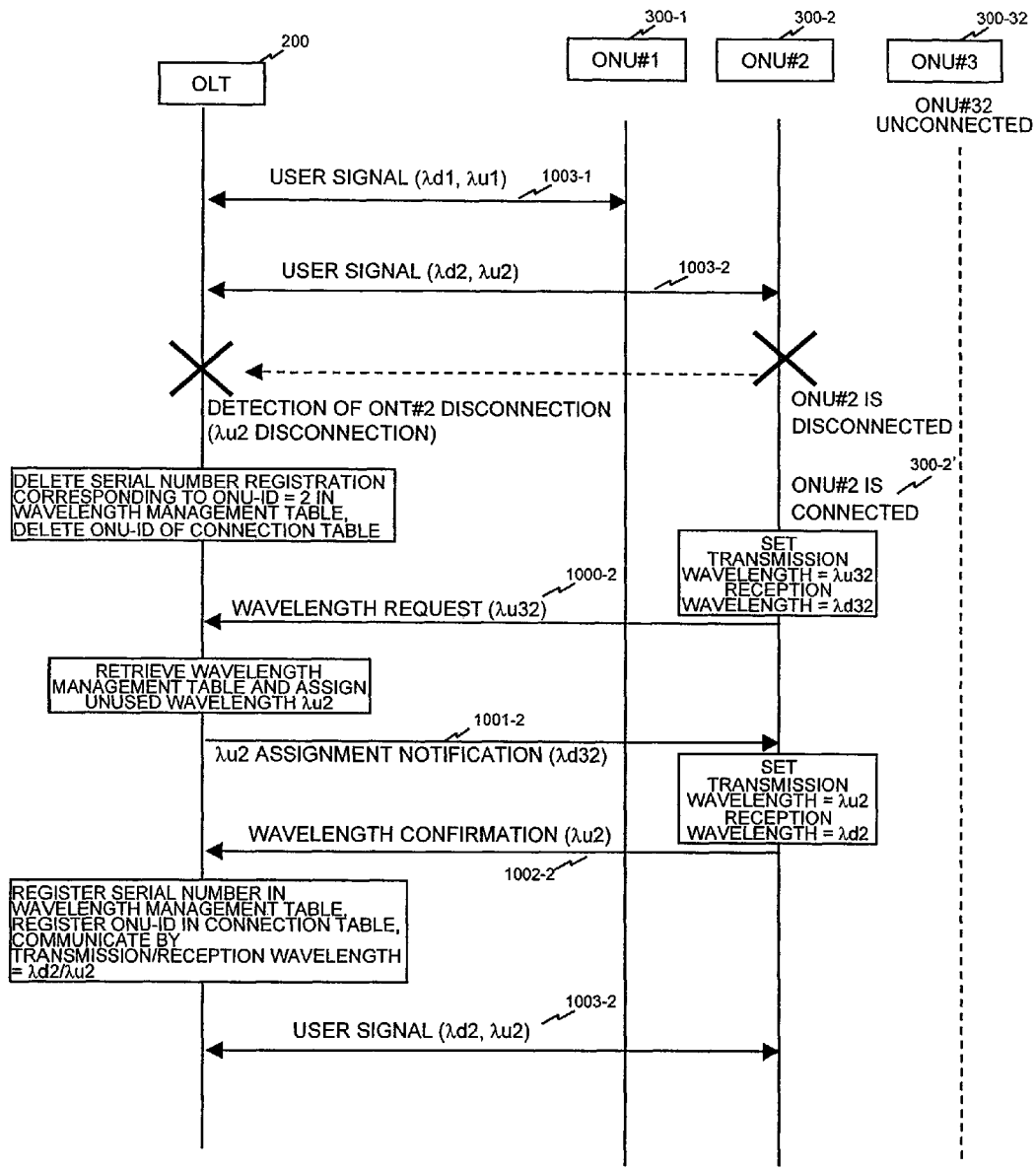
FIG. 10 is a sequence view (1) at the time when an ONU is disconnected and an ONU is connected in the first embodiment.

FIG. 10 is a sequence view (1) at the time when an ONU is disconnected and an ONU is connected.

The operation in the case where one ONU 300 is disconnected and another ONU 300 is connected will be described with reference to FIG. 10. In this example, the ONU 300-1 and the ONU 300-2 are connected to the OLT 200 and communication is performed (1003-1, 1003-2), and the ONU 300-32 has not been connected.

For example, when the ONU 300-2 is disconnected, since the signal reception of $\lambda u2$ is interrupted, the OLT 200 detects the disconnection of the ONU 300-2. The OLT 200 changes the column of the wavelength $\lambda u2$ (that is, the ONU-ID is "2") of the wavelength management table 220 to an unregistered entry. For example, the serial number corresponding to the wavelength $\lambda u2$ is deleted, and is made unregistered. Besides, based on the deleted serial number, a reference is made to the connection management table 221, and the corresponding ONU-ID is deleted from the connection management table 221. The wavelength management table becomes, for example, the state of FIG. 12B.

Thereafter, when an ONU 300-2' having another serial number is connected, similarly to the above, the ONU 300-2' sets its own transmission wavelength to $\lambda u32$, and transmits a wavelength assignment request signal 1000-2. On the other hand, the OLT 200 uses the wavelength $\lambda u32$ to always monitor the received control signal, and after receiving the wavelength assignment request signal 1001-2, the OLT refers to the wavelength management table 220, assigns the downstream wavelength $\lambda d2$ and the upstream wavelength $\lambda u2$ as the wavelength for #2, which is the smallest number at this point, from the unregistered entry, and transmits a control signal 1001-2. Hereinafter, by a sequence similar to that of FIG. 9, $\lambda d2$ and $\lambda u2$ are used, and the bidirectional communication between the ONU 300-2' and the OLT 200 is established.

Figure 11:
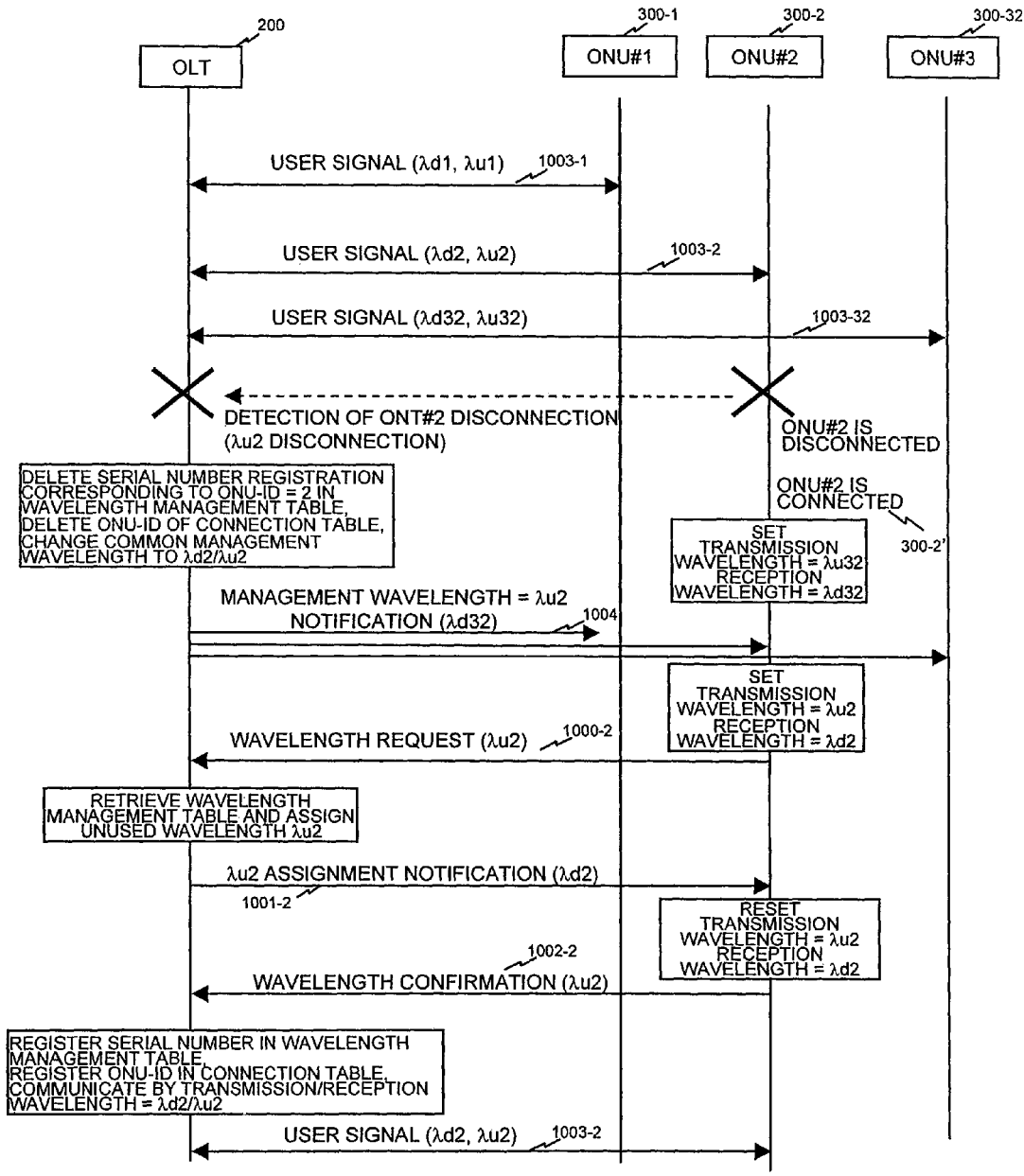
FIG. 11 is a sequence view (2) at the time when an ONU is disconnected and an ONU is connected in the first embodiment.

FIG. 11 is a sequence view (2) at the time when an ONU is disconnected and an ONU is connected.

Next, another operation in which one ONU is disconnected and another ONU is connected will be described with reference to FIG. 11. In this example, all ONUs of from the ONU 300-1 to the ONU 300-32 are connected and the communication is carried out. FIG. 13A shows the content of the wavelength management table 220 at this time.

When the ONU 300-2 is disconnected, since the signal reception of $\lambda u2$ is interrupted, the OLT 200 detects the disconnection of the ONU 300-2, and similarly to the above, the column of the ONU#2 in the wavelength management table 220 is changed to an unregistered entry. In this example, since the management wavelength $\lambda d32$ is used also for the communication of ONU 300-32, the wavelengths $\lambda d2$ and $\lambda u2$ may be set as the management wavelengths. FIG. 13B shows the content of the wavelength management table 220 at this time. Besides, based on the deleted serial number, a reference is made to the connection management table 221, and the corresponding ONU-ID is deleted from the connection management table 221.

Here, by the wavelength $\lambda d32$, the OLT 200 uses a control wavelength notification signal 1004 shown in FIG. 8B and notifies the ONU 300 that the present control wavelength (management wavelength) is changed to $\lambda d2$ and $\lambda u2$. The OLT 200 may transmit the control wavelength notification signal 1004 plural times.

Thereafter, when the ONU 300-2' (serial number "A000 0040") having another serial number is connected, the ONU 300-2' sets its own reception wavelength to the previously determined wavelength $\lambda d32$, and then reads the control wavelength notification signal 1004 and detects that the present control wavelength is changed to $\lambda d2$ and $\lambda u2$. The ONU 300-2' sets its own transmission wavelength to $\lambda u2$, and similarly to the above, transmits a wavelength assignment request signal 1000-2. Incidentally, here, the signal is transmitted with the wavelength $\lambda u2$.

On the other hand, the OLT 200 uses the wavelength $\lambda u2$ to always monitor the received control signal, and after receiving the wavelength assignment request signal 1001-2, the OLT refers to the wavelength management table 220, and assigns the downstream wavelength $\lambda d2$ and the upstream wavelength $\lambda u2$ as the wavelength for #2, which is the smallest number at this point, from the unregistered entry, and transmits the control signal 1001-2.

Hereinafter, by a sequence similar to that of FIG. 9, the bidirectional communication is established. The content of the wavelength management table in which the wavelength is assigned to the ONU 300-2' becomes the content shown in FIG. 13C.

2. Second Embodiment (System Structure)

Figure 14:
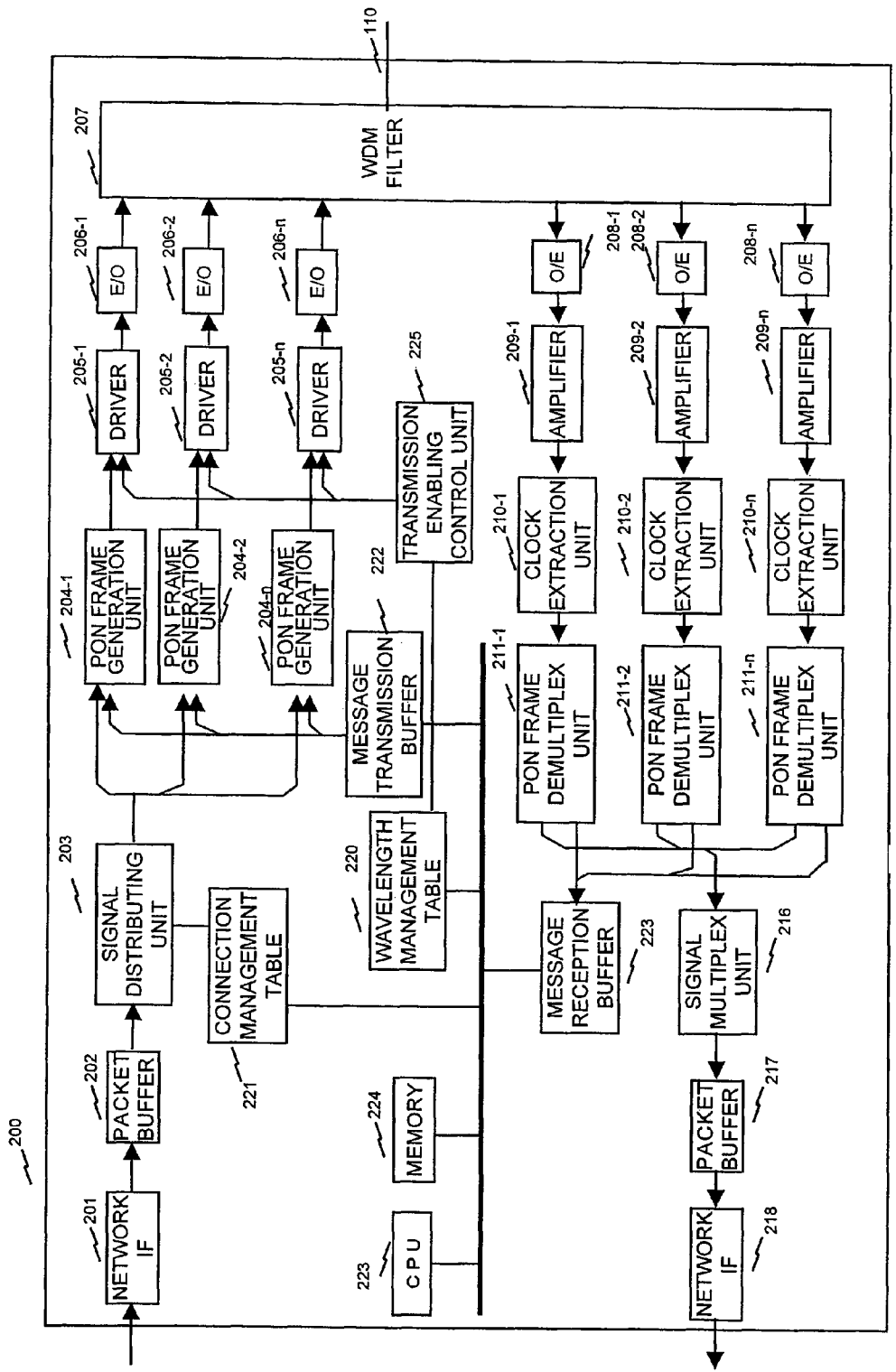
FIG. 14 shows a structural example of an OLT in a second embodiment.

FIG. 14 shows a structural example of an OLT 200 of this embodiment.

The difference from the structure of FIG. 3 is that, for example, a transmission enabling control unit 225 connected to a wavelength management table 220 is further provided, and a driver is not enabled for a wavelength the use of which is not registered in the wavelength management table 220, and light of a downstream wavelength is not emitted. For example, a driver of a downstream wavelength in which a serial number is not registered in the wavelength management table 220 is disabled. Accordingly, an ONU 300 monitors the presence or absence of a signal for each downstream wavelength, and can now which wavelength is unused.

Figure 15:
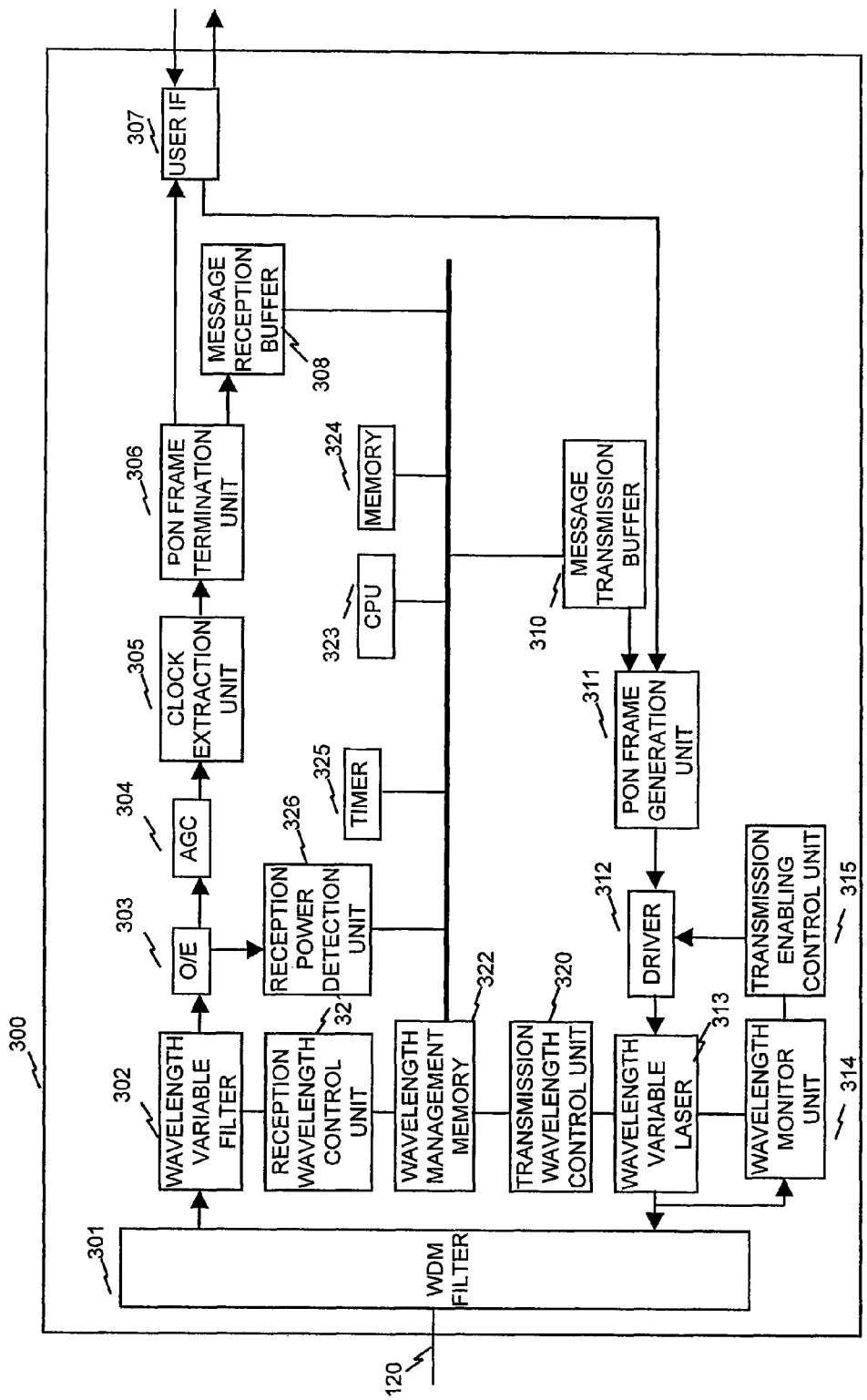
FIG. 15 shows a structural example of an ONU in the second embodiment.

FIG. 15 shows a structural example of the ONU 300 of this embodiment.

One of differences from the structure of FIG. 4 is that a reception power detection unit 326 is connected to an O/E 303. While referring to a timer 325, a CPU 323 changes a downstream wavelength in a wavelength management memory from $\lambda d1$ to $\lambda d32$ in sequence, for example, at constant intervals, and controls a wavelength variable filter 302 through a reception wavelength control unit 321. In the O/E, since the wavelength from $\lambda d1$ to $\lambda d32$ is sequentially photoelectric-converted, the CPU 323 monitors the output of the reception power detection unit 326, and can know which downstream wavelength is unused. For example, a wavelength in which the reception power is zero or almost zero is unused.

Another difference from the structure of FIG. 4 is that a part of output of a wavelength variable laser 313 is connected to a wavelength monitor unit 314, the output of the wavelength monitor unit 314 is connected to a transmission enabling control unit 315, and a driver 312 is controlled to be enabled. When the transmission wavelength deviates from the set wavelength by a failure in the wavelength variable laser 313 or a transmission wavelength control unit 320, there is a fear that a bad influence is exerted on the upstream signal of another ONU 300, and therefore, it is necessary to avoid this trouble. The wavelength monitor unit 314 monitors whether the value of the upstream wavelength of the wavelength management memory 322 and the transmission wavelength of the wavelength variable laser 313 deviate from each other to exceed a previously determined range. When detecting the deviation, the wavelength monitor unit 314 stops the operation of the driver 312 by the transmission enabling control unit 315. By this operation, the upstream signal is stopped, and the OLT having detected the stop of the upstream wavelength again attempts to perform wavelength assignment of this ONU 300. However, when the ONU 300 has a trouble in wavelength control, the wavelength assignment operation can not be performed with the correct wavelength, and it is determined that this ONU is out of order. Incidentally, a network structure and the structure of other respect parts of the OLT 200 and the ONU 330 are the same as those of the first embodiment.

Figure 16:
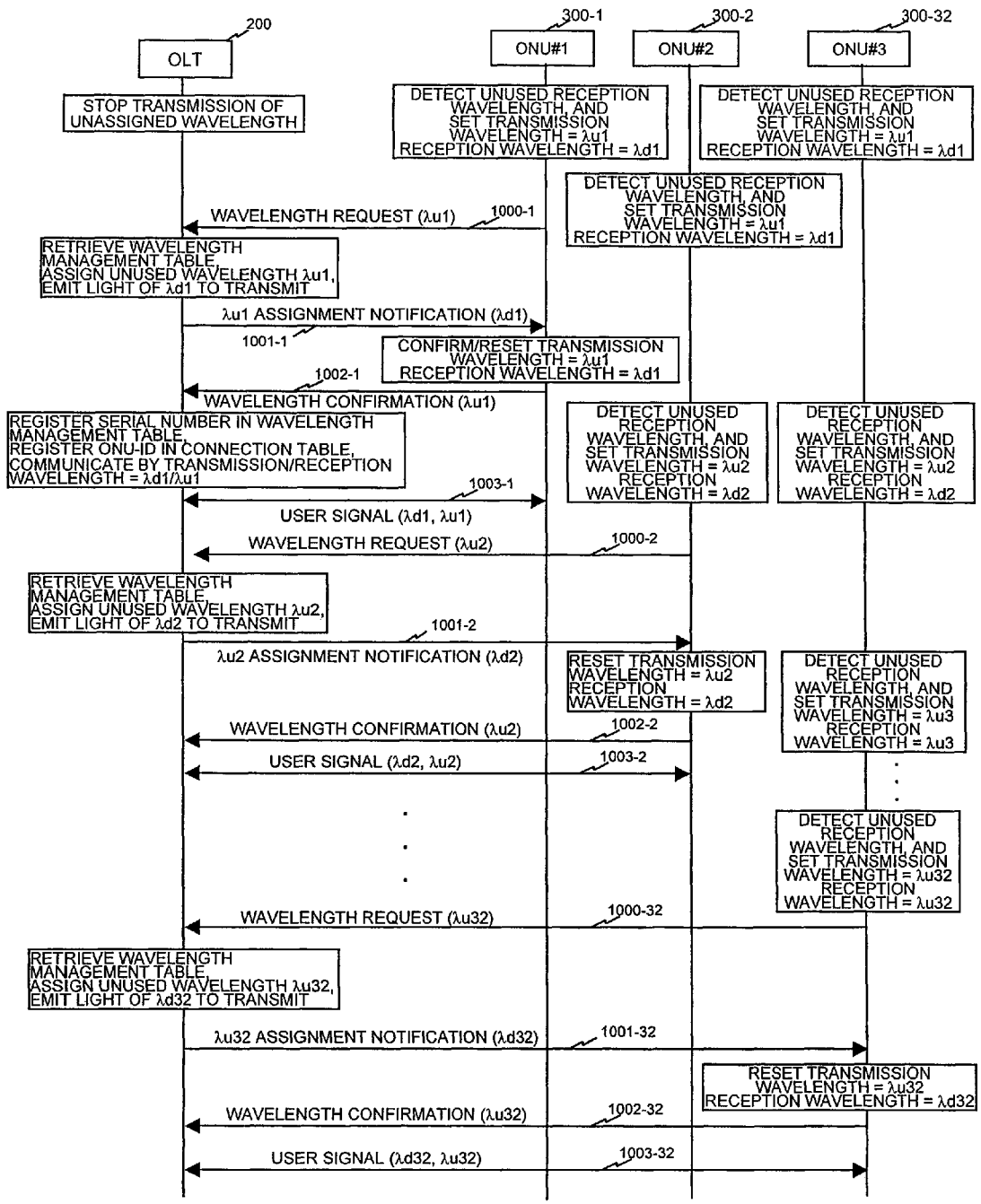
FIG. 16 is a sequence view of wavelength assignment in the second embodiment.

FIG. 16 is an operation sequence view in the second embodiment.

Here, the OLT detects the presence or absence of reception signals concerning all wavelengths usable for upstream communication of the WDM-PON system, and based on the result of the presence or absence of the reception signals and the previously determined correspondence between the downstream wavelength and the upstream wavelength, the OLT stops signal transmission of a downstream wavelength corresponding to an upstream wavelength in which there is no reception signal. Accordingly, in the initial state in which no ONU is connected, signals are not outputted in all downstream wavelengths. When the ONU 300-1 is connected, the ONU 300-1 detects the presence or absence of a reception signal concerning all wavelengths usable for the downstream communication at the time of initial start-up. Here, it is detected that all wavelengths of $\lambda d1$ to $\lambda d32$ are unused. The ONU 300-1 selects, for example, $\lambda u1$, generates a control message (wavelength assignment request) 1000-1 to request $\lambda u1$ and $\lambda d1$ paired thereto, as assignment of wavelengths used for the communication with the OLT 200, in the format of FIG. 7B, and transmits it with the wavelength $\lambda u1$.

The OLT 200 receives the control message 1000-1 with the wavelength $\lambda u1$, and enables the driver 205 of $\lambda d1$ corresponding to $\lambda u1$ by the transmission enabling control unit 225. The OLT 200 generates a control message (wavelength assignment request signal) 1001-1 in the format of FIG. 7C, which notifies that the wavelengths assigned to the communication with the ONU 300-1 are $\lambda u1$ and $\lambda d1$, and transmits it with $\lambda d1$. Incidentally, the OLT 200 refers to the wavelength management table 220, and may assign wavelengths (for example, $\lambda u2$ and $\lambda d2$) different from the wavelengths $\lambda u1$ and $\lambda d1$.

The ONU 300-1 sets its own reception wavelength to $\lambda d1$ paired with $\lambda u1$, and receives the control signal 1001-1. The ONU 300-1 confirms that its own transmission wavelength is $\lambda u1$ and the reception wavelength is $\lambda d1$ based on the content of the received control signal 1001-1, and performs resetting. The ONU 300-1 uses the control signal (wavelength confirmation, control message) 1002-1 to notify the OLT 200 that its own wavelength setting is completed.

The OLT 200 stores, for example, the ONU serial number included in the control signal 1002-1 correspondingly to the wavelengths $\lambda d1$ and $\lambda u1$ of the wavelength management table 220. Besides, the OLT 200 registers the ONU-ID into the connection management table. The OLT 200 uses the wavelength $\lambda d1$ to transmit the user signal of the address for ONU#1 registered in the connection table 221, while the ONU 300-1 uses the wavelength $\lambda u1$ to transmit the user signal, and the bidirectional communication is established.

Incidentally, in the case where wavelengths (for example, $\lambda u2$ and $\lambda d2$) different from the wavelengths $\lambda u1$ and $\lambda d1$ are assigned, similarly to the first, embodiment, when receiving the control message, the OLT 200 refers to the wavelength management table, and assigns the second downstream wavelength $\lambda d2$ and the second upstream wavelength $\lambda u2$, which are not used for communication with another ONU 300, to the communication with the ONU 300. Further, the OLT 200 uses the first downstream wavelength $\lambda d1$ to transmit a second control message to notify the assigned second downstream wavelength information and the second upstream wavelength information to the ONU 300. The ONU 300 receives the second control message by the second receiver set to the first downstream wavelength, uses the wavelength control unit to set the transmission wavelength of the second transmitter to the second upstream wavelength based on the second control message, and sets the reception wavelength of the second receiver to the second downstream wavelength. The ONU 300 and the OLT 200 communicate with each other by the second downstream wavelength and the second upstream wavelength.

When the first upstream wavelength or the second upstream wavelength assigned to the ONU 300 is not received for a specified time by the first receiver, the OLT 200 detects that the connection with the ONU 300 is disconnected. When the disconnection of the connection is detected, the transmission enabling control unit disables the first transmitter of the first or the second downstream wavelength paired with the first or the second upstream wavelength.

In the second embodiment, since $\lambda u32$ is not shared as a default unlike the first embodiment, the possibility of collision of the upstream signals is lower, and the embodiment is suitable for effective start-up.

The invention can be used for, for example, an access network using an optical technique, and an optical access system using a PON system.

What is claimed is:

1. A passive optical network system which comprises an optical line termination, an optical splitter, an optical fiber, and a plurality of optical network units connected to the optical line termination through the optical splitter and in which the optical line termination communicates with the optical network units in wavelength division multiplexing,
    wherein the optical line termination includes:
    a plurality of first transmitters having light source respectively which wavelengths are different from each other;
    a plurality of first receivers to receive signals of a plurality of wavelengths;
    a wavelength management table to manage information of a wavelength assigned for communication with each of the optical network units for each of identifiers of the optical network units;
    a first control unit to receive a control message to assign a wavelength from the optical network unit and to assign the wavelength for the communication between the optical line termination itself and the optical network unit; and
    a transmission enabling control unit to cause only a wavelength under communication with the optical network unit to be outputted by enabling or disabling each of the plurality of first transmitters,
    wherein each of the optical network units includes:
    a second receiver to receive a signal of a set wavelength;
    a second transmitter to transmit a signal of a set wavelength;
    a reception power detection unit to detect reception power in the second receiver;
    a second control unit to transmit the control message to assign the wavelength through the second transmitter; and
    a wavelength control unit to variably control a transmission wavelength of the second transmitter and a reception wavelength of the second receiver,
    wherein the second control unit of the optical network unit sequentially changes the reception wavelength of the second receiver by the wavelength control unit to each of transmission wavelengths of the plurality of first transmitters of the optical line termination,
    detects reception power of a downstream signal from the optical line termination to the optical network unit by the reception power detection unit for each wavelength, obtains a first downstream wavelength not used for other communications based on the reception power,
    sets the reception wavelength of the second receiver to the first downstream wavelength by the wavelength control unit, and sets the transmission wavelength of the second transmitter to a first upstream wavelength paired with the first downstream wavelength, and
    transmits, by using the first upstream wavelength, a control message to request assignment of a wavelength to be used for communication with the optical line termination to the optical line termination,
    wherein the optical line termination
    according to receiving the control message, assigns the first downstream wavelength and the first upstream wavelength to communication with the optical network unit, or refers to the wavelength management table to assign a second downstream wavelength and a second upstream wavelength, which are not used for other communications, to communication with the optical network unit, and
    enables the first transmitter corresponding to the first downstream wavelength or the second downstream wavelength by the transmission enabling control unit, and
    wherein the optical network unit and the optical line termination communicate with each other with the first downstream wavelength and the first upstream wavelength, or the second downstream wavelength and the second upstream wavelength.

2. The passive optical network system according to claim 1,
    wherein the optical line termination
    refers to the wavelength management table when the control message is received, and assigns the second downstream wavelength and the second upstream wavelength, which are not used for the communications with other optical network units, to the communication with the optical network unit, and
    transmits, by using the first downstream wavelength, a second control message to notify information of assigned second downstream wavelength and information of assigned second upstream wavelength to the optical network unit, and
    wherein
    the optical network unit receives the second control message by the second receiver set to the first downstream wavelength, sets the transmission wavelength of the second transmitter to the second upstream wavelength, and sets the reception wavelength of the second receiver to the second downstream wavelength by the wavelength control unit based on the second downstream wavelength, and the optical network unit and the optical line termination communicate with each other with the second downstream wavelength and the second upstream wavelength.

3. The passive optical network system according to claim 1, wherein the optical line termination detects that connection with the optical network unit is disconnected when the first or the second upstream wavelength assigned to the optical network unit is not received by the first receiver for a specified time, and disables the first transmitter of the first or the second downstream wavelength paired with the first or the second upstream wavelength by the transmission enabling control unit.

4. A wavelength assignment method in a passive optical network system which includes an optical line termination, an optical splitter, an optical fiber, and a plurality of optical network units connected to the optical line termination through the optical splitter and in which the optical line termination communicates with the optical network units in wavelength division multiplexing, wherein the optical network unit sequentially changes a reception wavelength of a receiver of the optical network unit to each of transmission wavelengths of a plurality of transmitters of the optical line termination, detects reception power of a downstream signal from the optical line termination to the optical network unit for each wavelength, obtains a first downstream wavelength not used for other communications based on the reception power, sets the reception wavelength of the receiver of the optical network unit to the obtained first downstream wavelength, and sets the transmission wavelength of the transmitter of the optical network unit to a first upstream wavelength paired with the first downstream wavelength, and transmits, by using the first upstream wavelength, a control message to request assignment of a wavelength to be used for communication with the optical line termination to the optical line termination, wherein the optical line termination according to receiving the control message, assigns the first downstream wavelength and the first upstream wavelength to communication with the optical network unit, or refers to a wavelength management table for managing wavelength information assigned for communication with each of the optical network units for each of identifiers of the optical network units, assigns a second downstream wavelength and a second upstream wavelength, which are not used for other communications, to communication with the optical network unit, and enables the transmitter of the optical line termination corresponding to the first downstream wavelength or the second downstream wavelength, and wherein the optical network unit and the optical line termination communicate with each other with the first downstream wavelength and the first upstream wavelength, or the second downstream wavelength and the second upstream wavelength.

* * * * *